(12) United States Patent
Kawaguchi

(10) Patent No.: US 9,864,553 B2
(45) Date of Patent: Jan. 9, 2018

(54) INFORMATION PROCESSING APPARATUS CONFIGURED TO DISPLAY ICON

(71) Applicant: Brother Kogyo Kabushiki Kaisha, Nagoya (JP)

(72) Inventor: Masafumi Kawaguchi, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/265,000

(22) Filed: Sep. 14, 2016

(65) Prior Publication Data

US 2017/0185356 A1  Jun. 29, 2017

(30) Foreign Application Priority Data

Dec. 24, 2015  (JP) .................................. 2015-251751

(51) Int. Cl.
*G06F 3/12* (2006.01)
*H04N 1/00* (2006.01)

(52) U.S. Cl.
CPC .......... *G06F 3/1204* (2013.01); *G06F 3/1257* (2013.01); *G06F 3/1258* (2013.01); *G06F 3/1275* (2013.01); *H04N 1/00474* (2013.01); *H04N 1/00477* (2013.01); *H04N 2201/0094* (2013.01)

(58) Field of Classification Search
CPC .................................................... G06F 3/1204
USPC ................................................ 358/1.13, 1.15
See application file for complete search history.

(56) References Cited

U.S. PATENT DOCUMENTS

2003/0103232 A1* 6/2003 Twede .................. G06F 3/1204
358/1.15
2009/0323096 A1* 12/2009 Oshima .................. G06Q 10/06
358/1.13

FOREIGN PATENT DOCUMENTS

JP  2006-209248 A  8/2006
JP  2015-195037 A  11/2015

* cited by examiner

*Primary Examiner* — Jacky X Zheng
(74) *Attorney, Agent, or Firm* — Burr & Brown, PLLC

(57) ABSTRACT

A non-transitory computer readable storage medium stores a set of program instructions for an information processing apparatus. The set of program instructions when executed by a processor, causes the information processing apparatus to perform: acquiring device identification information to identify a selected device selected from among the at least one device; acquiring image data identification information to identify image data; acquiring setting information including a print setting for printing an image based on the image data; storing in the storage the device identification information and a print workflow in correlation with each other; and displaying a device image and a first instruction image. The first instruction image is configured to be operated to output toward the device an instruction to execute a print process in accordance with the print workflow stored in correlation with the device identification information.

16 Claims, 18 Drawing Sheets

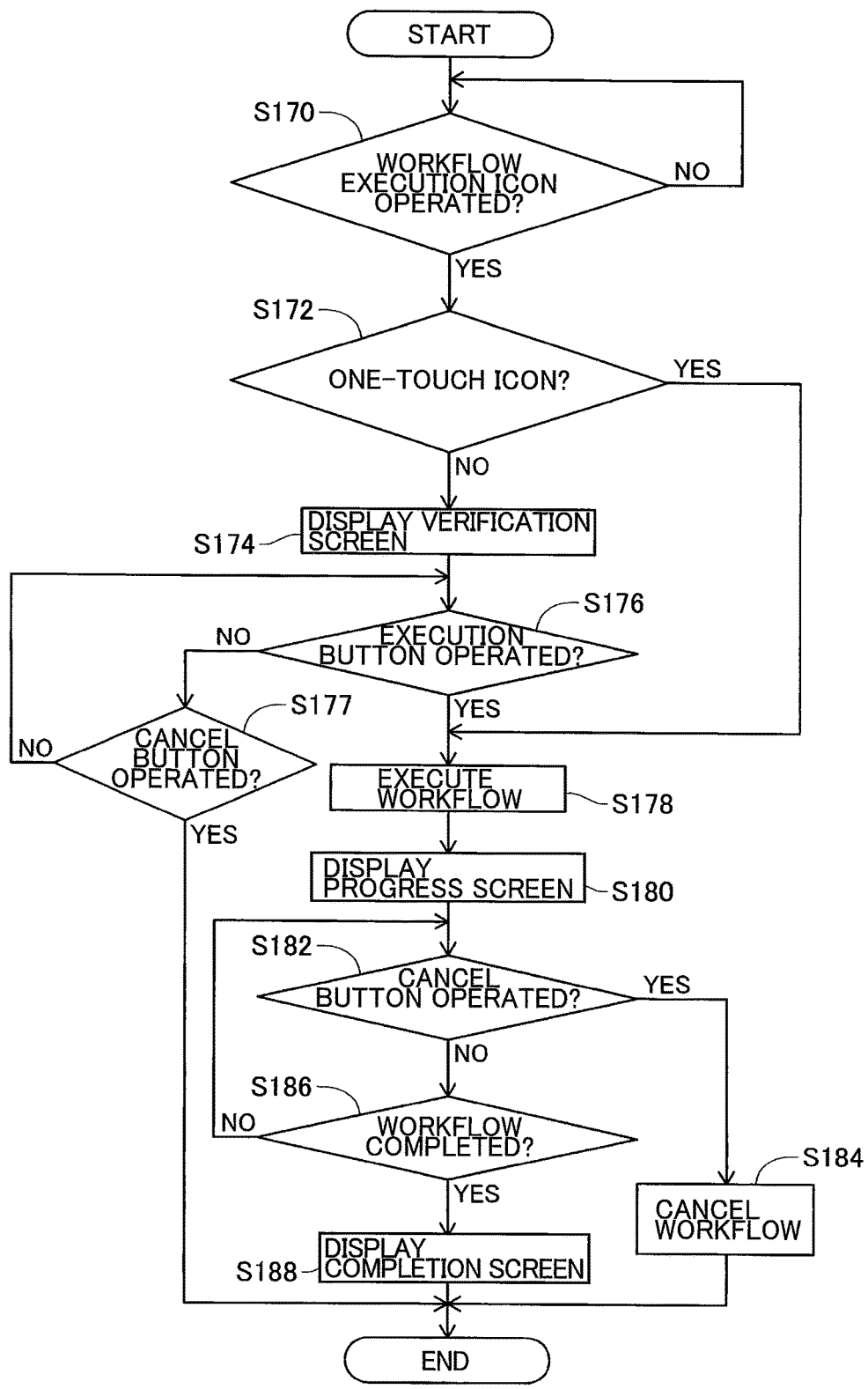

INFORMATION PROCESSING APPARATUS CONFIGURED TO DISPLAY ICON

CROSS REFERENCE TO RELATED APPLICATION

This application claims priority from Japanese Patent Application No. 2015-251751 filed Dec. 24, 2015. The entire content of the priority application is incorporated herein by reference.

TECHNICAL FIELD

The disclosure relates to an information processing apparatus and storage medium storing program instructions.

BACKGROUND

Japanese Patent Application Publication No. 2006-209248 discloses a data processing device in which a list of functions of a printer corresponding to a printer icon is displayed upon detection of one-touch section of the displayed printer icon.

SUMMARY

However, the publication does not disclose execution of a registered workflow which is a flow for execution of a combination of previously registered input function and output function. It is therefore an object of the disclosure to provide a simple method that involves technique for executing a workflow for the printer.

According to one aspect, the disclosure provides a non-transitory computer readable storage medium storing a set of program instructions for an information processing apparatus including a processor, storage, a display, and an interface connectable to at least one device. The set of program instructions, when executed by the processor, causes the information processing apparatus to perform: acquiring device identification information to identify a selected device selected from among the at least one device; acquiring image data identification information to identify image data; acquiring setting information including a print setting for printing an image based on the image data; storing in the storage the device identification information and a print workflow for printing the image in accordance with the print setting in correlation with each other; and displaying a device image and a first instruction image in correlation with each other in the display. The device image indicates a device identified by the device identification information. The first instruction image is configured to be operated to output toward the device an instruction to execute a print process in accordance with the print workflow stored in correlation with the device identification information.

According to another aspect, the disclosure provides an information processing apparatus including storage; a display; an interface connectable to at least one device; and a controller. The controller is configured to perform: acquiring device identification information to identify a selected device selected from among the at least one device; acquiring image data identification information to identify image data; acquiring setting information including a print setting for printing an image based on the image data; storing in the storage the device identification information and a print workflow for printing the image in accordance with the print setting in correlation with each other; and displaying a device image and a first instruction image in correlation with each other in the display. The device image indicates a device identified by the device identification information. The first instruction image is configured to be operated to output toward the device an instruction to execute a print process in accordance with the print workflow stored in correlation with the device identification information.

BRIEF DESCRIPTION OF THE DRAWINGS

The particular features and advantages of the disclosure will become apparent from the following description taken in connection with the accompanying drawings, in which:

FIG. 21 is a flowchart illustrating steps in operation of a workflow execution icon according to the embodiment.

DETAILED DESCRIPTION

Figure 1:
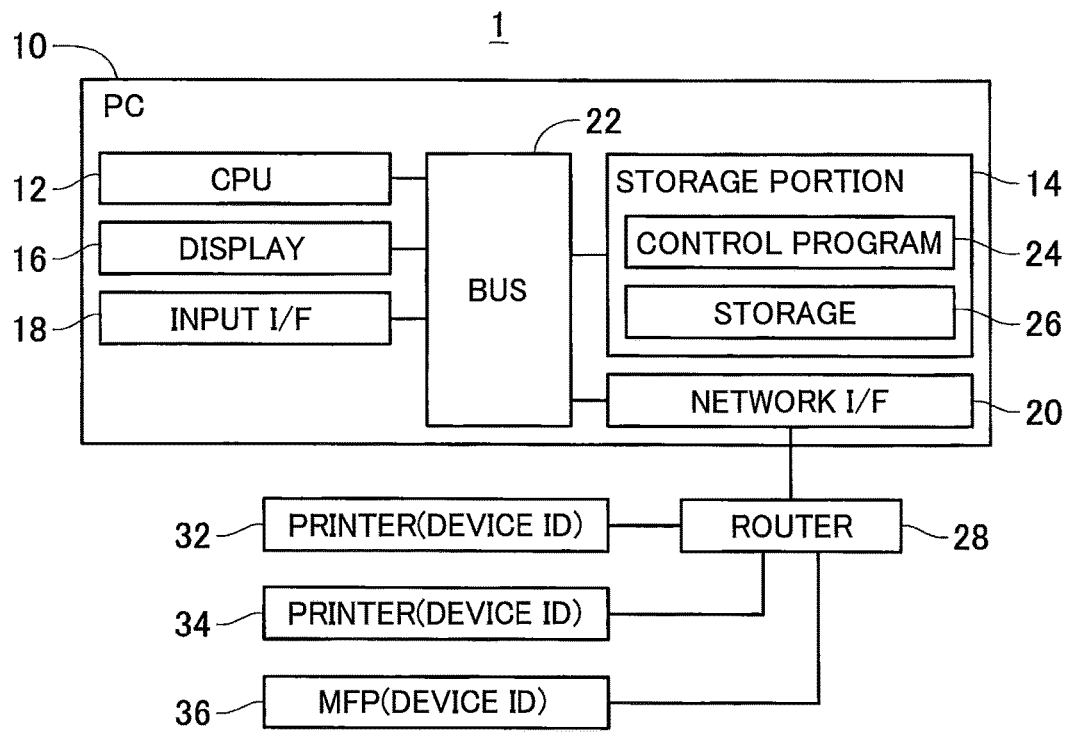
FIG. 1 is a block diagram of a communication system according to an embodiment.

A communication system according to an embodiment will be described while referring to the accompanying drawings wherein like parts and components are designated by the same reference numerals to avoid duplicating description.

[Structure of Communication System]

FIG. 1 is a block diagram showing the communication system according to the embodiment. The communication system 1 includes a PC (personal computer) 10 as an example of an "information processing apparatus", a printer 32 as an example of a "device", a printer 34 as an example of a "device", and a MFP (multifunction peripheral) 36 as an example of a "device".

The PC 10 includes a CPU (central processing unit) 12 as an example of a "controller" or "processor", a storage portion 14, a display 16, an input I/F 18, and a network I/F 20 (those interfaces are examples of an "interface"). These components are communicated with each other by a BUS 22.

The CPU 12 is capable of executing processing in accordance with a control program 24 stored in the storage portion 14. The control program 24 is capable of executing various processes such as printing process. In the following description, the CPU 12 executing the control program 24 will be occasionally referred to as a name of a program. For example, the expression "the control program 24" will occasionally implies "the CPU 12 executing the program 24". The storage portion 14 includes a RAM (random access memory), a ROM (read only memory), a flash memory, a HDD (hard disk drive), and a buffer provided in the CPU 12. Further, the storage portion 14 is provided with storage 26. The storage 26 is adapted to store data necessary for the execution of the control program 24.

The display 16 is adapted to display various screens in accordance with image data. An LCD (liquid crystal display) display and an organic EL (electroluminescence) display are examples of the display 16; alternatively, other displays may be the display 16. The input I/F 18 includes a keyboard and a mouse. The keyboard includes a plurality of keys for executing various functions of the PC 10. The mouse is adapted to operate a pointer (not shown) shown in the display 16. The input I/F 18 can be a touch panel integrally included in the display 16. The touch panel can receive user's operation to an icon displayed on the display 16.

The network I/F 20 is capable of communicating with an external device connected to a network such as wireless LAN and a wired LAN, and is connected via a router 28 to the printer 32, the printer 34, and the MFP 36. Thus, the PC 10 can perform data communication to the printer 32, the printer 34 and the MFP 36 through the network I/F 20. Incidentally, the printer 32 is a device that is capable of executing a printing process, and the printer 34 is a device that is not capable of executing a scanning process but adapted to execute the printing process. The MFP 36 is a device that is capable of executing the printing process and the scanning process. Incidentally, a facsimile device capable of executing facsimile transmission may be one of the devices. Further, a device ID as an example of "device identification information" is stored in each of the printers 32, 34 and the MFP 36 for identifying the "device". The device ID is specific data capable of identifying one device from other device(s) on the network. For example, serial number, Mac address, or a combination thereof can be the device ID.

[Execution of Various Processes using Workflow]

The PC 10 is connected to the devices such as the printers 32, 34, and the MFP 36 and a workflow can be set for each of the devices. The icon in accordance with the workflow presently set is shown on the display 16. Upon operation to the icon, various processes in accordance with the workflow will be executed. Incidentally, the workflow is processing to co-operatingly execute an input process and an output process. Specifically, the input process is for inputting a processing target and the output process is for processing and outputting the data that has been inputted in the input process, in accordance with conditions preset for the input and output processes.

Figure 2:
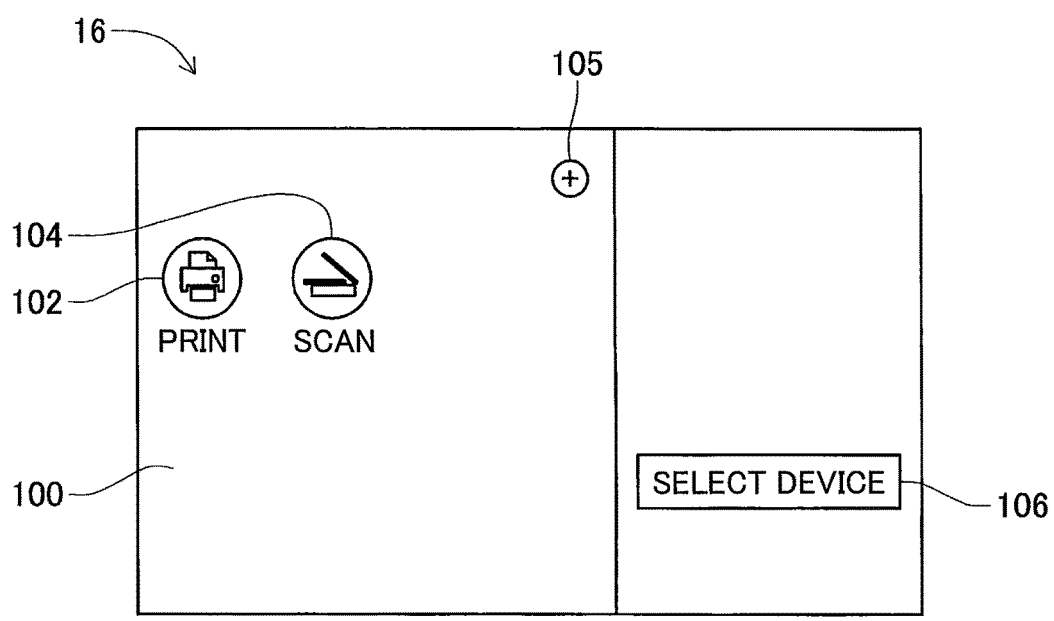
FIG. 2 illustrates a first top screen according to the embodiment.

More specifically, a first top screen 100 shown in FIG. 2 appears on the display 16 of the PC 10 when the PC 10 receives an instruction to start the control program 24 from a user. In the first top screen 100, a print processing icon 102 (example of a second instruction image), a scan processing icon 104, a workflow creation button 105, and a device selection button 106 are shown. The print processing icon 102 is an operation icon for executing the printing process in accordance with the user's selection or settings. A screen for selecting an image of a print target, and a screen for the print settings are shown on the display 16 when the print processing icon 102 is operated. Thus, the print process can be executed by the user's selection and settings in the screens. The scan processing icon 104 is an operation icon for executing the scanning process in accordance with predetermined settings. A screen for setting scanning and a screen for setting or selecting a saving location of scan data produced by the scanning process are shown in the display 16 when the scan processing icon 104 is operated. Thus, the user can freely select or set the scan process in the screens. Further, the workflow creation button 105 is adapted to create a workflow described later.

Figure 3:
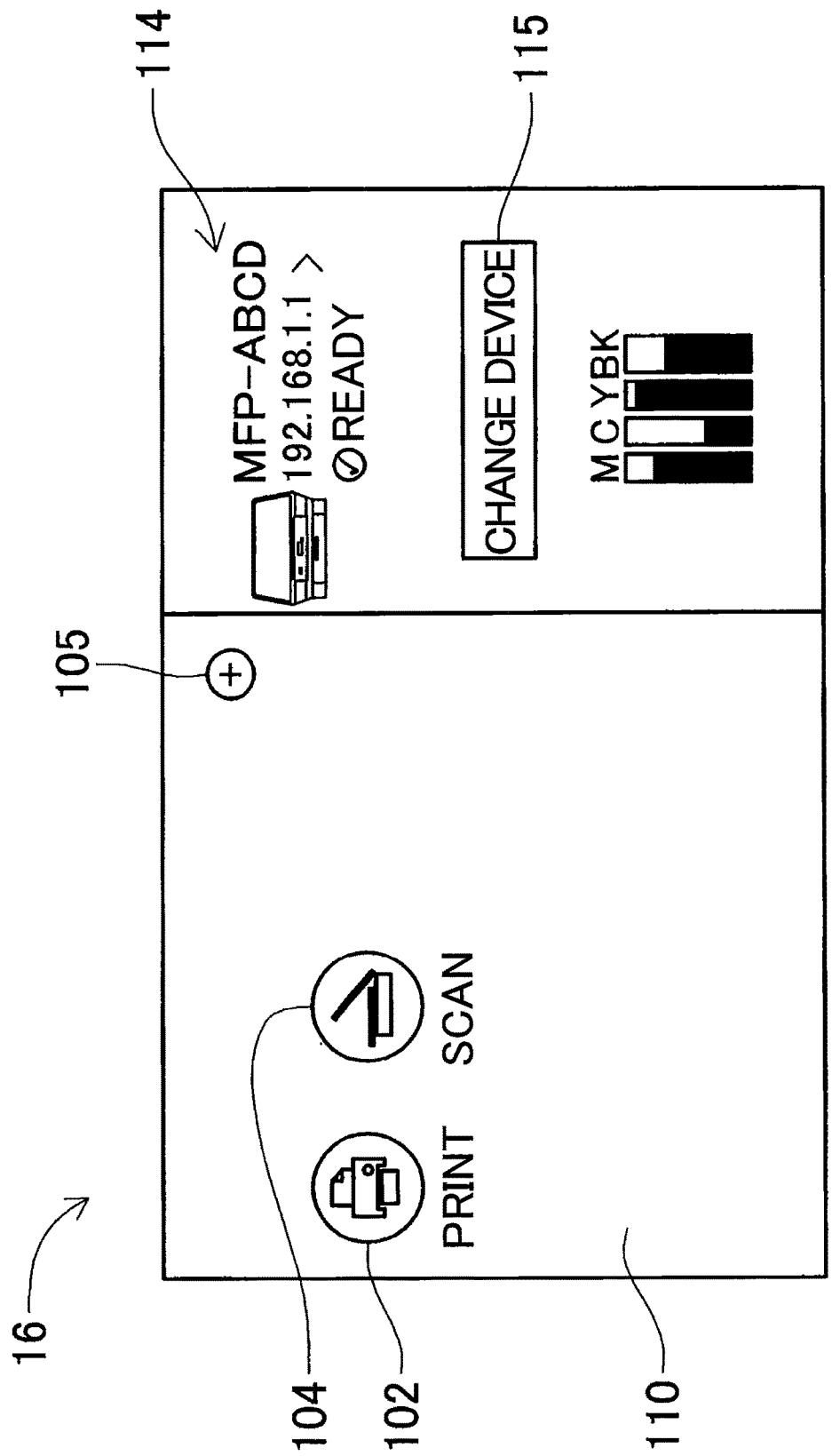
FIG. 3 illustrates a second top screen according to the embodiment.

The device selection button 106 is an operation button for selecting a device at which various processing such as printing process can be performed. When the device selection button 106 is operated, the control program 24 searches at least one of the devices connected to the PC 10, i.e., one of the printers 32, 34 and the MFP 36, and shows a section screen (not shown) on the display 16 for selecting one of the devices. More specifically, the CPU 12 obtains a device ID, IP address and model name of the printers 32, 34 and the MFP 36 in searching the device, and displays the obtained data on the selection screen. Incidentally, operation on the device selection button 106 is made by clicking a left mouse button while the cursor is moved by the mouse over the device selection button 106. The selected device is specified when the device is freely selected or set on the selection screen. Then, the data of device ID, IP address and model name of the specified device are stored in the storage 26. Further, a second top screen 110 as illustrated in FIG. 3 is displayed on the display 16 when the device is freely selected on the selection screen.

When the second top screen 110 is displayed, function of the device selected on the selection screen (hereinafter simply referred to as a "selected device"), i.e., executable processes in the selected device are specified, and an operation icon in accordance with the executable process is shown on the second top screen 110. More specifically, the device ID and the process executable in the device are linked and stored in the storage 26 with respect to each of the devices connected to the PC 10. For example, when the MFP 36 is selected on the selection screen, the printing process and the scanning process linked with the device ID of the MFP 36, which are stored in the storage 26 are specified, so that an icon 102 for printing process and an icon 104 for the scanning process are displayed on the second top screen 110 as illustrated in FIG. 3.

Further, a workflow creation button 105, a device image 114, and a device changing button 5 are displayed on the second top screen 110. The device image 114 is a combination of an external view and an illustration of the selected device, i.e., the MFP 36 and a product name of the MFP 36. Alternatively, the device image 114 can be one of the external view and the product name of the selected device. In this way, the second top screen 110 displays the operation icon such as the print processing icon 102 and the scan processing icon 104 which correspond to processing executable in the MFP 36 identified by the device image 114. The printing process or the scanning process can be executed in the MFP 36 in response to the operation on the operation icon.

Incidentally, when the printer 32 or 34 is selected as the selected device, the print processing icon 102, the device image (not shown) of one of the printers 32 and 34, and the workflow creation button 105 are displayed on the second top screen 110.

The operation icon corresponding to the process executable by the selected device is displayed in the second top screen 110, whereas in the first top screen 100, the operation icon corresponding to the executable processing is undecided since a device has not been selected. Therefore, in the first top screen 100, a preset operation icon corresponding to a predetermined process is shown. That is, the printing process and the scanning process have already been set in the PC 10, and the print processing icon 102 and the scan processing icon 104 respectively corresponding to the printing process and the scanning process are displayed on the first top screen 100.

Further, the device changing button 115 is capable of receiving instruction for changing the selected device. Similar to the operation to the device selection button 106, when the device changing button 115 is operated by a user, the control program 24 searches at least one of the devices connected to the PC 10 and shows the section screen (not shown) on the display 16 for selecting one of the devices. Then, the control program 24 waits for selection of the freely-selected device by the user.

Figure 4:
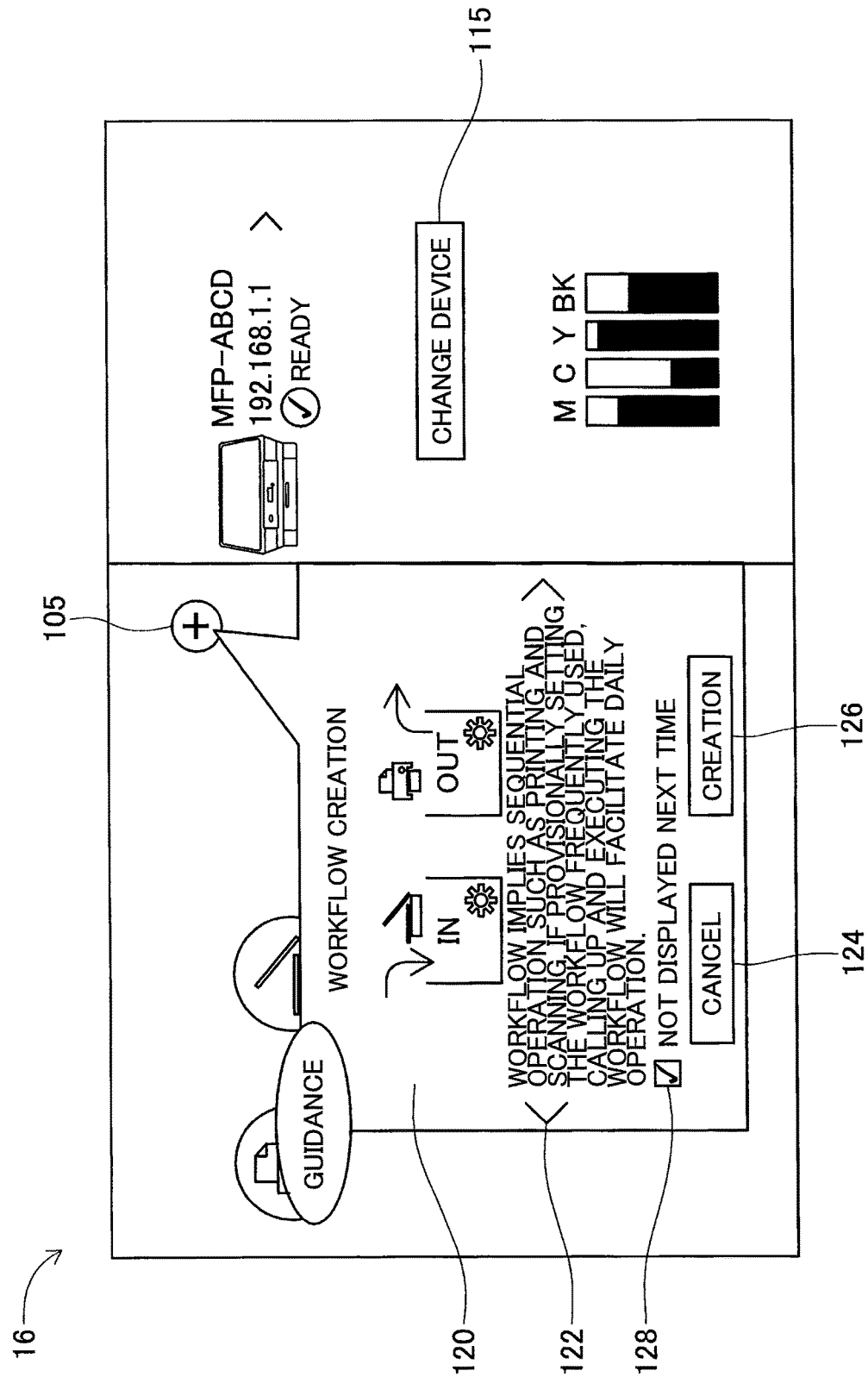
FIG. 4 illustrates a word balloon screen according to the embodiment.

A situation where the workflow creation button 105 is operated on the second top screen 110 will be described. In the following description, the printer 32 is selected as the selected device. A word balloon screen 120 emerging from the workflow creation button 105 is displayed on the display 16 as illustrated in FIG. 4, when the workflow creation button 105 is operated on the second top screen 110. In the word balloon screen 120, a comment 122, a cancel button 124, a creation button 126, and a check box 128 are displayed.

As described above, the workflow is a flow for executing various processes such as a printing process in accordance with preset conditions, and the comment 122 simply describes this explanation of the workflow. The cancel button 124 is a button for cancelling creation of the workflow. The word balloon screen is erased and the second top screen 110 appears on the display 16 in response to the operation on the cancel button 124. The creation button 126 is a button for creating the workflow. A first function selection screen 130 shown in FIG. 5, which is an example of a selection screen, appears on the display 16 in response to the operation on the creation button 126. The check box 128 is adapted to prevent the word balloon screen 120 from being displayed in a next operation. Appearance of the word balloon screen 120 will be prohibited in response to checking the check box 128. Therefore, if the check box 128 is checked, the first function selection screen 130 appears on the display 16 in response to the operation to the workflow creation button 105 on the second top screen 110.

According to the above, the second top screen 110 appears on the display 16 when the device is selected in the first top screen 100, and the word balloon screen 120 appears on the display 16 when the workflow creation button 105 is operated on the second top screen 110. The outline or displaying mode of each of the screens is changed in accordance with the number of operations performed by a user. More specifically, the word balloon display 120 appears on the display 16, when the selected device is determined on the first top screen 100 in the condition where the number of operations on the icon such as the print processing icon 102 or the scan processing icon 104 in the second top screen 110 exceeds a predetermined number of times, e.g., more than 5 times. That is, after the first top screen 100 appears on the display 16, the word balloon screen 120 appears in a superposed manner on the second top screen 110. For this reason, if the number of operations on the icon falls within the range from zero to five times, the first top screen 100, the second top screen 110, and the word balloon screen 120 appear on the display 16 in this order. Otherwise, if the number of operations on the icon is more than five times, the first top screen 100 and another screen in which the second top screen 110 and the word balloon screen 120 are superposed with each other appear on the display 16 in this order. As described above, the above settings have a function to actively notify the existence of the process using the workflow to the user who has performed the operations more than predetermined times, because the various processing using the workflow is highly sophisticated or advanced technique in comparison with the ordinary process such as the printing process using the print processing icon 102 or the scanning process using the scan processing icon 104.

Figure 5:
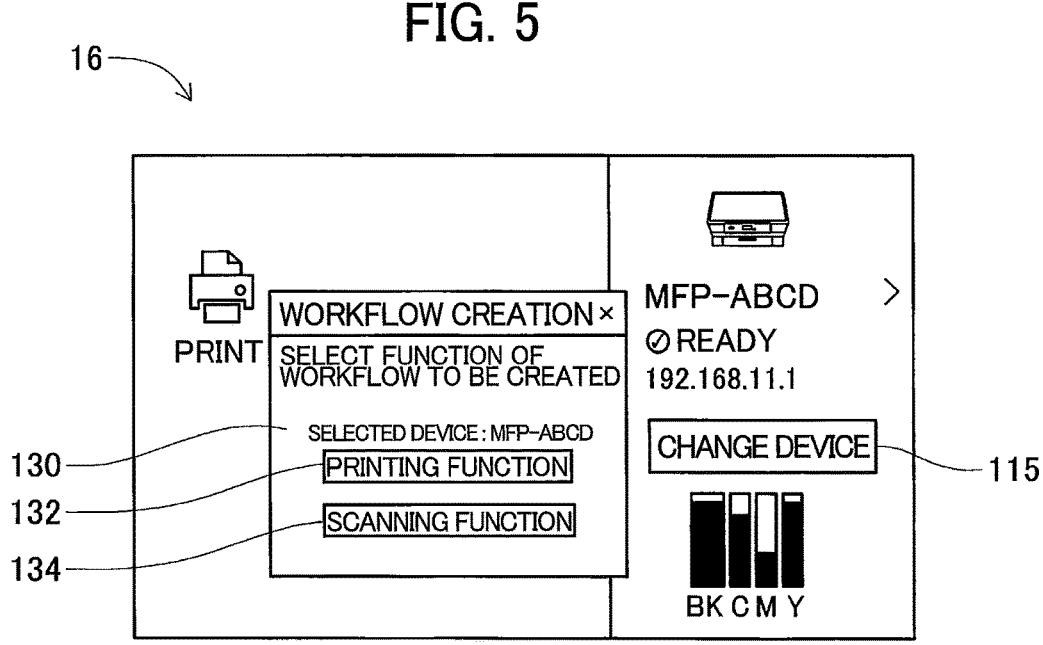
FIG. 5 illustrates a first function selection screen according to the embodiment.

The first function selection screen 130 illustrated in FIG. 5 appears on the display 15, when the workflow creation button 105 is operated on the second top screen 110 or when the creation button 126 is operated on the word balloon screen 120. The first function selection screen 130 is adapted to select functions of the workflow to be created. Similar to the appearance of the second top screen 110, the first function selection screen 130 specifies processes executable in the selected device. Selection buttons corresponding to the specified processes are displayed on the second top screen 110. That is, if the selected device is the printer 32, a print selection button 132 and a scan selection button 134 are shown on the first function selection screen 130.

Figure 6:
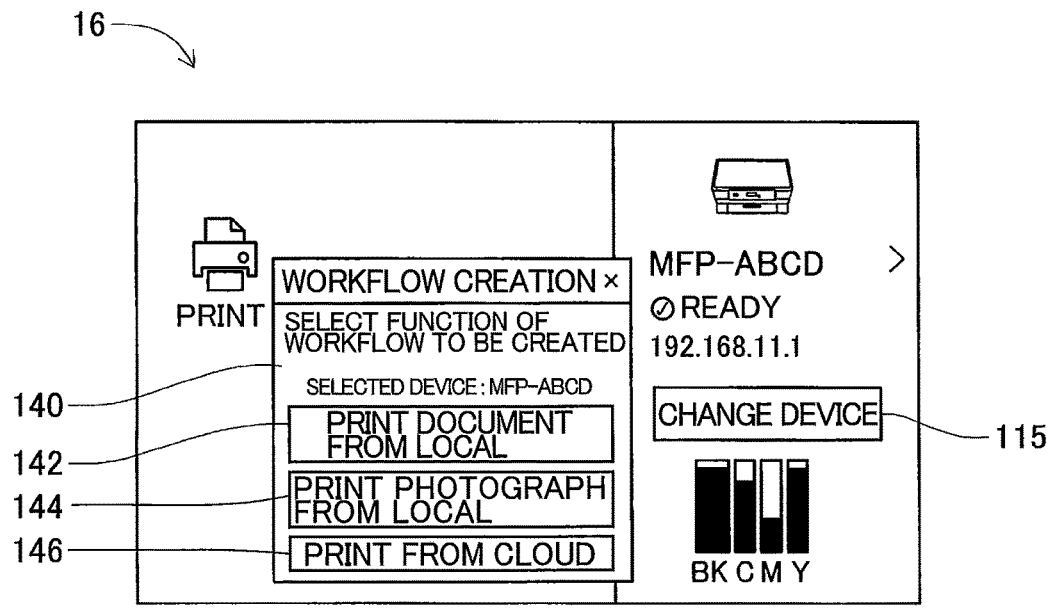
FIG. 6 illustrates a second function selection screen according to the embodiment.
Figure 7:
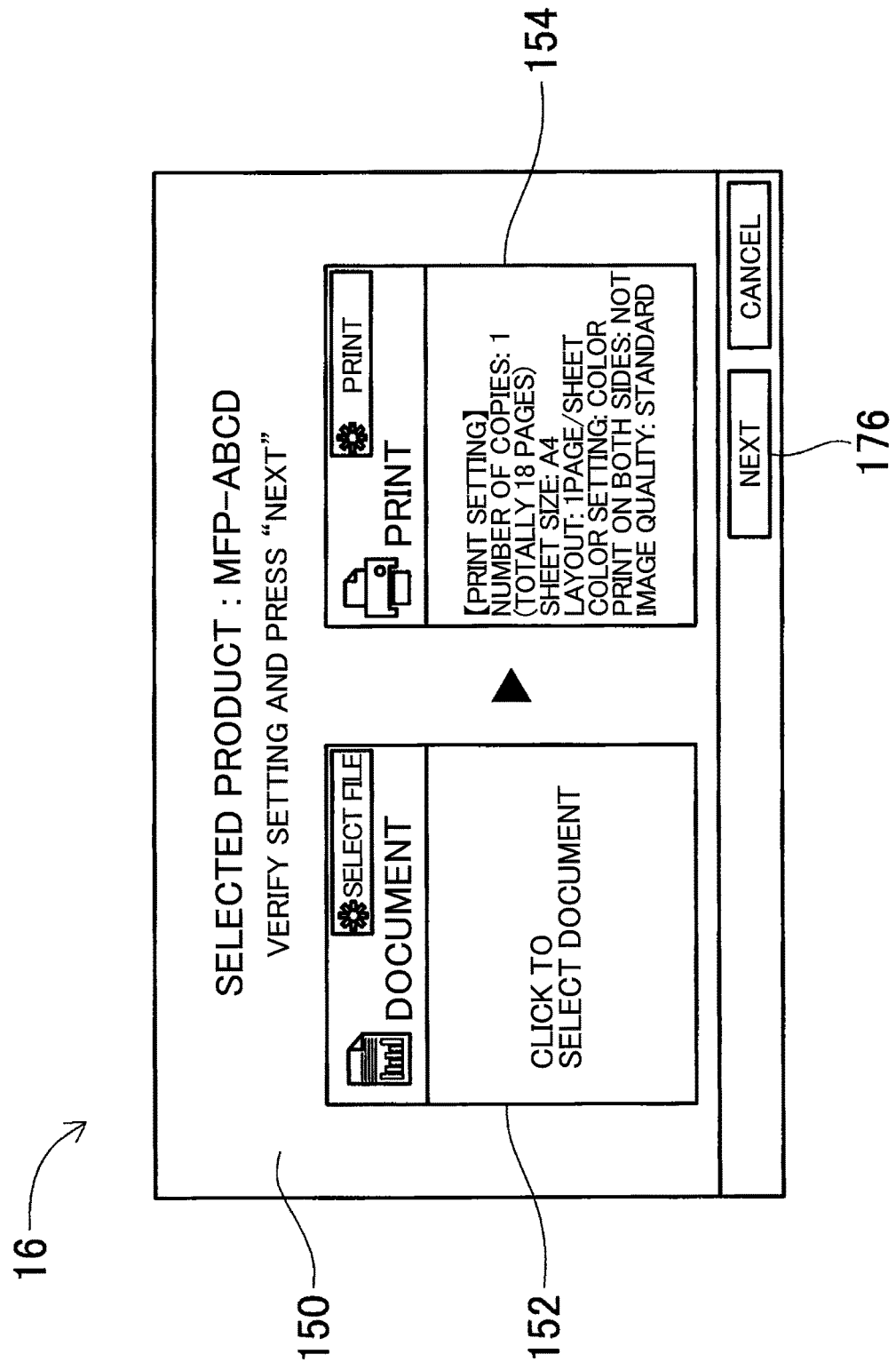
FIG. 7 illustrates a process information setting screen according to the embodiment.
Figure 8:
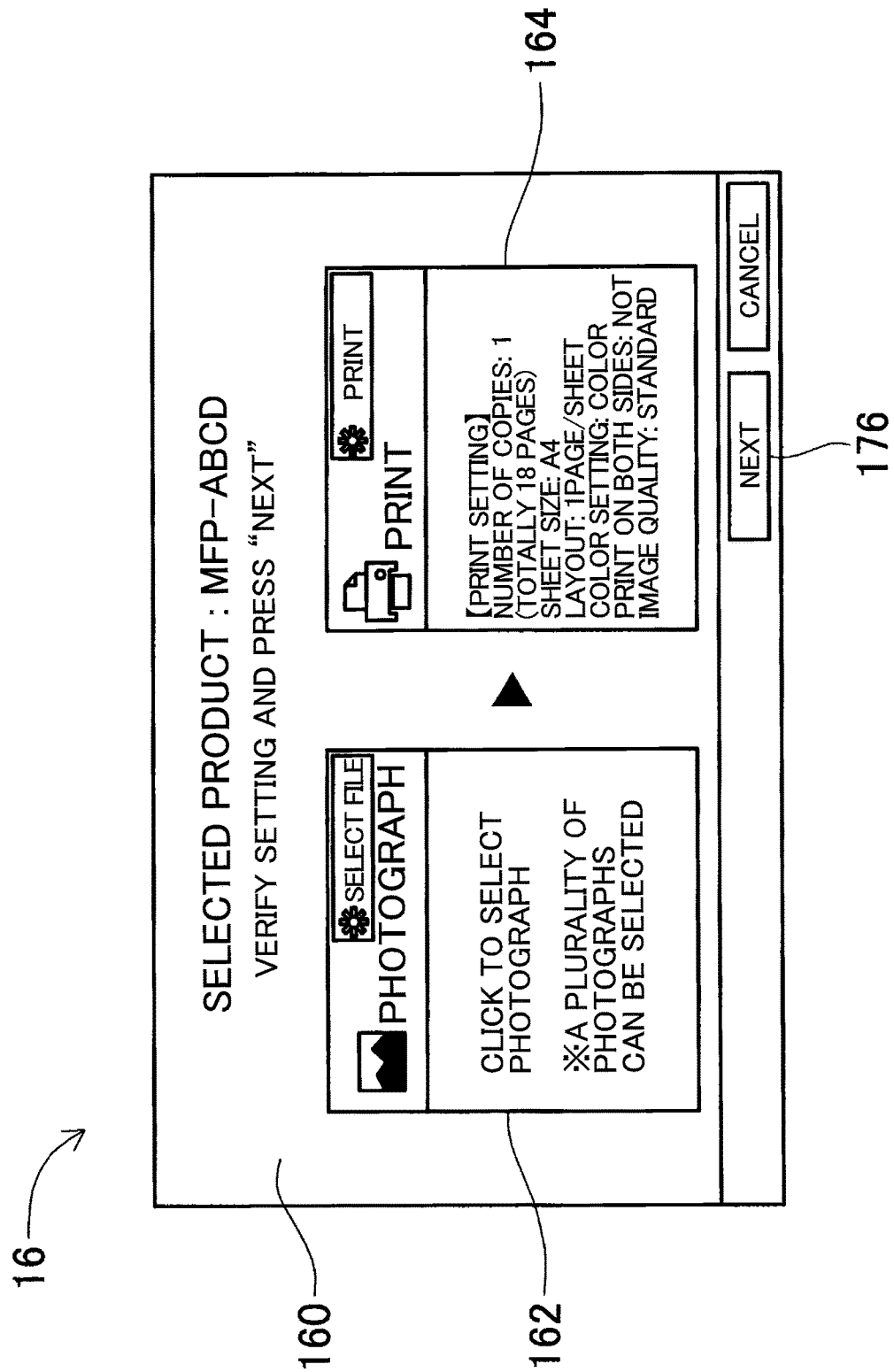
FIG. 8 illustrates a process information setting screen according to the embodiment.

Next, a second function selection screen 140 appears on the display 16 as illustrated in FIG. 6 when the print selection button 132 is operated on the first function selection screen 130. The second function selection screen 140 is adapted to select more detailed function of the printing workflow or the printing function. A document selection button 142, a photograph selection button 144 and a cloud service selection button 146 are shown on the second function selection screen 140. A process information setting screen 150 corresponding to the document printing processing appears on the display 16 as illustrated in FIG. 7 when the document selection button 142 is operated.

A document setting column 152 and a print setting column 154 are shown on the process information setting screen 150. The document setting column 152 is adapted to freely set a document as a print target image. By operating the document setting column 152 by the user, a document as the print target is selected among documents stored in the storage 26 such as a document created in a word processing software, a document created in spreadsheet software, and a PDF file. The print setting column 154 is adapted to set printing condition. By operating the print setting column 154 by the user, the printing condition such as the number of copies, sheet size, request for duplex printing, and request for color printing can be set.

A process information setting screen 160 corresponding to photograph printing process appears on the display 16 when the photograph selection button 144 is operated on the second function selection screen 140. A photograph setting column 162 and a print setting column 164 are shown on the process information setting screen 160. The photograph setting column 162 is adapted to freely set a photograph as a print target image. By operating the photograph setting column 162 by the user, a photograph as the print target is selected among photographs stored in the storage 26. The print setting column 164 is adapted to set printing condition. By operating the print setting column 164 by the user, the printing condition such as the number of copies, form type, sheet size, request for setting margins, and request for color printing can be set.

Figure 9:
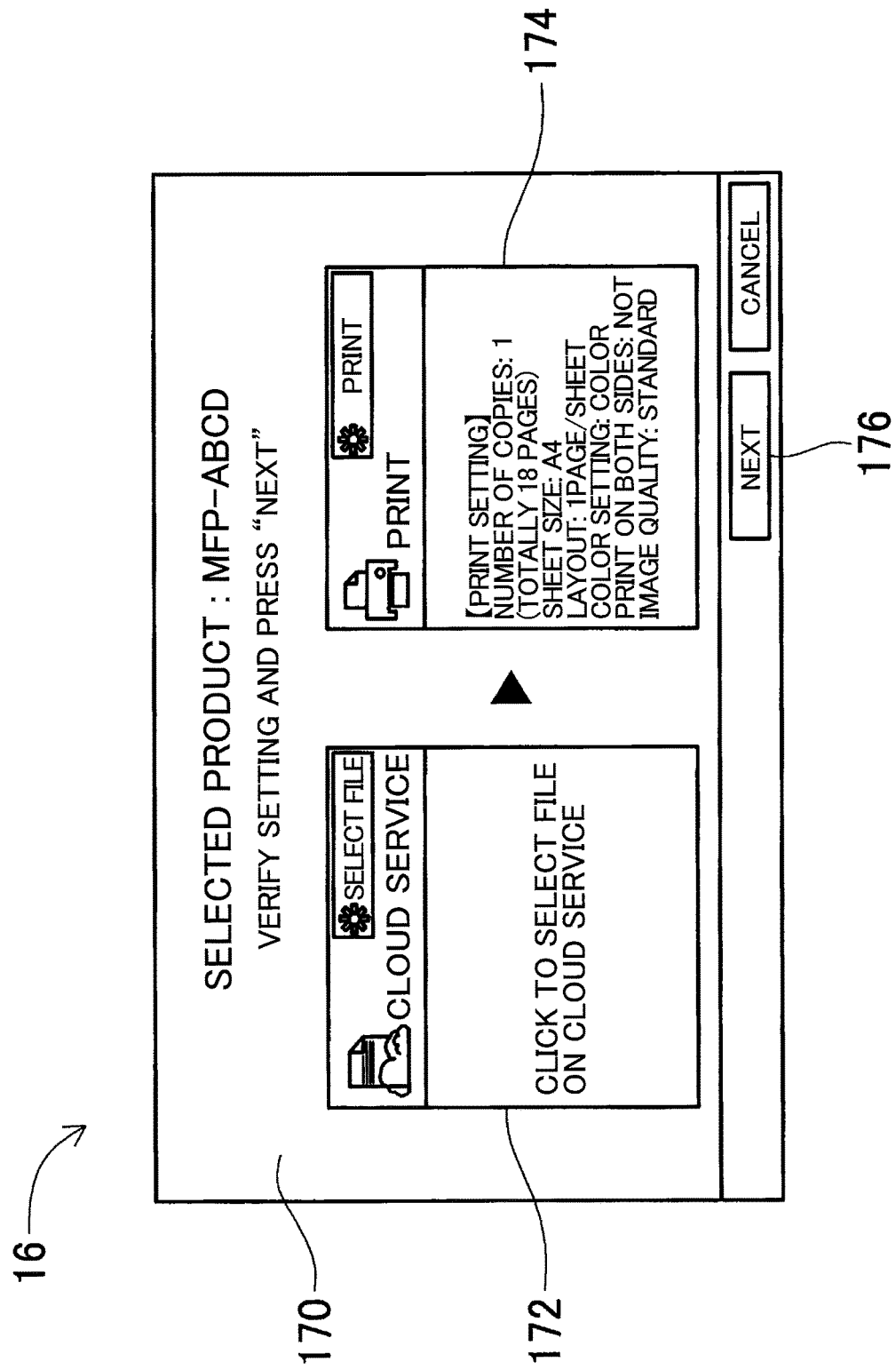
FIG. 9 illustrates a process information setting screen according to the embodiment.

A process information setting screen 170 corresponding to printing process to an image provided by a cloud as illustrated in FIG. 9 appears on the display 16 when the cloud service selection button 146 is operated on the second function selection screen 140. A cloud service setting column 172 and a print setting column 174 are shown on the process information setting screen 170. The cloud service setting column 172 is adapted to set an image provided in the cloud as a target image for printing. When the cloud service setting column 172 is operated by the user, one of cloud services is selected and an image can be selected as the print target image among images provided in the selected cloud. The print setting column 174 is capable of setting the printing condition. In accordance with the operation on the print setting column 174 by the user, printing condition such as the number of copies, sheet size, request for duplex printing, and request for color printing can be set.

Figure 10:
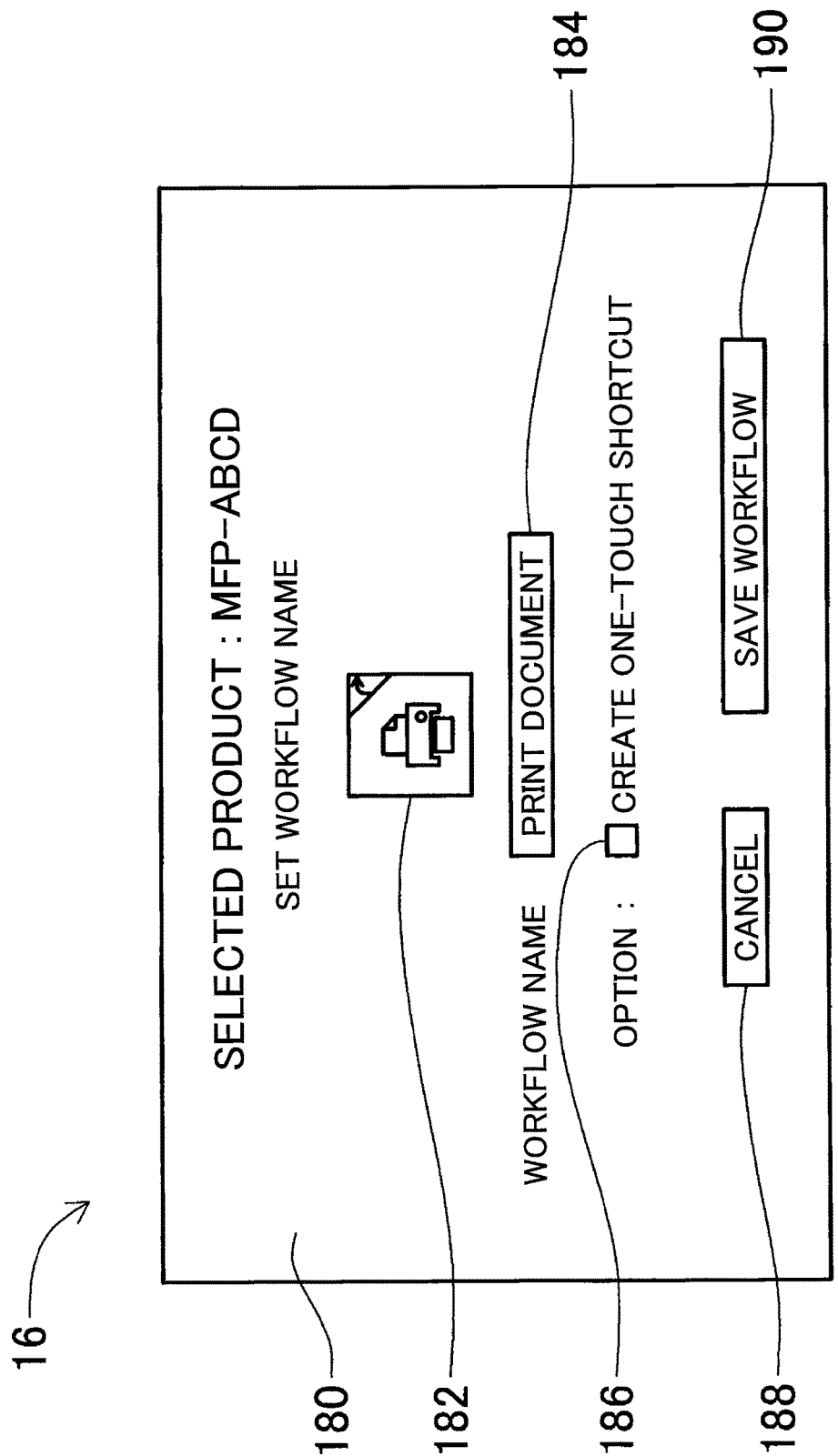
FIG. 10 illustrates a workflow creation screen according to the embodiment.

When a button 176 is operated in one of the process information setting screens 150, 160 and 170, a workflow creation screen 180 as illustrated in FIG. 10 appears on the display 16. An icon image 182, a workflow name input column 184, a check box 186, a cancel button 188, and a creation button 190 are shown in the workflow creation screen 180. The icon image 182 is adapted to be operated for executing the printing process in accordance with the created workflow. Detailed explanation of the icon will be described later. The workflow name input column 184 is adapted to input a name to be displayed and attached to the icon associated with the icon image 182. For example, when the document printing process is set as the workflow, that is, various settings are set on the process information setting screen 150 shown in FIG. 7, "Print Document" is inputted in the workflow name input column 184 as a default name of the workflow as illustrated in FIG. 10. Incidentally, the name on the workflow name input column 184 can be changed to a name of workflow that can be freely selected or set by the user.

The check box 186 is adapted to select whether to add a shortcut function to the icon associated with the icon image 182. When the check box 186 is operated, shortcut function is applied to the icon associated with the icon image 182. Incidentally, the shortcut function to the icon will be described later. The cancel button 188 is adapted to cancel creation of the workflow. The creation button 190 is adapted to execute creation of the workflow. Workflow can be created by operating the creation button 190.

Specifically, part of the workflow creation is to specify path data of the print target image data or the print target image (also referred to as "print target" hereinafter) set in one of the setting column 152, the photograph setting column 162, and the service setting column 172, which correspond to the setting screens 150, 160, and 170, respectively. Here, the path data is an example of image data identification data. Further, in the workflow creation, the printing condition is also specified. Here, the printing condition has been set in one of the print setting column 154, the print setting column 164, and the print setting column 174, which correspond to the process information setting screens 150, 160, and 170, respectively. The printing condition hereinafter is also simply referred to as "print settings" as an example of setting data. Then, workflow data containing the above specified data is created. In this way, the processing for printing the print target in accordance with the print settings is created as the workflow for printing process, which is an example of a printing workflow. That is, the printing workflow is defined as a workflow for executing the printing process of the predetermined image in accordance with the predetermined print settings.

Further, the device ID of the selected device and the shortcut data (as an example of print processing execution data) are stored as the workflow data in the storage 26 in correlation with each other. Incidentally, the shortcut data is data for confirming whether the check box 186 is checked. If the check box 186 is checked the shortcut data is set to ON, and if the check box 186 is not checked the shortcut data is set to OFF. The workflow data is created in accordance with the above procedure, and is stored in the storage 26.

Figure 11:
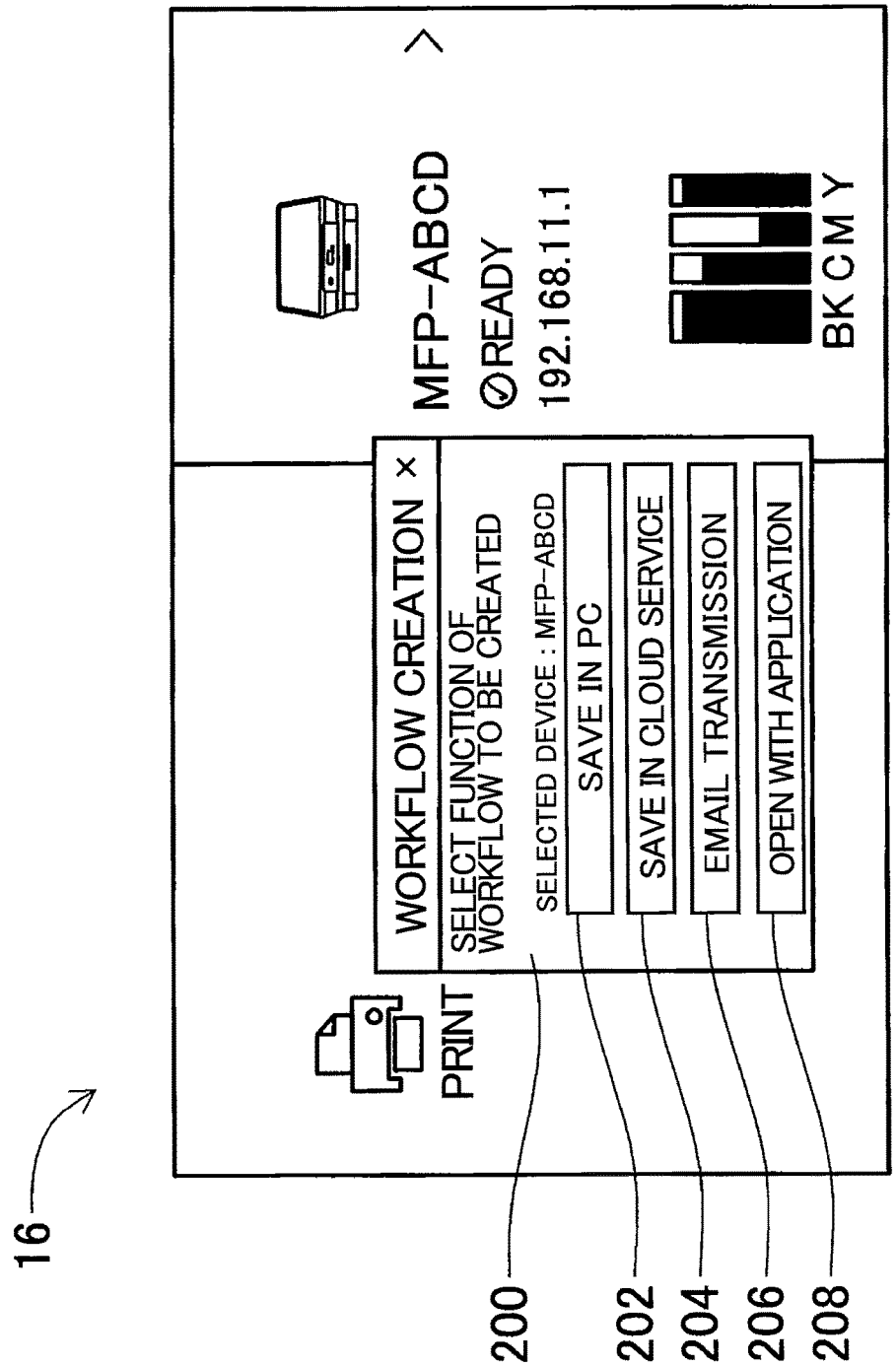
FIG. 11 illustrates a second function selection screen according to the embodiment.
Figure 12:
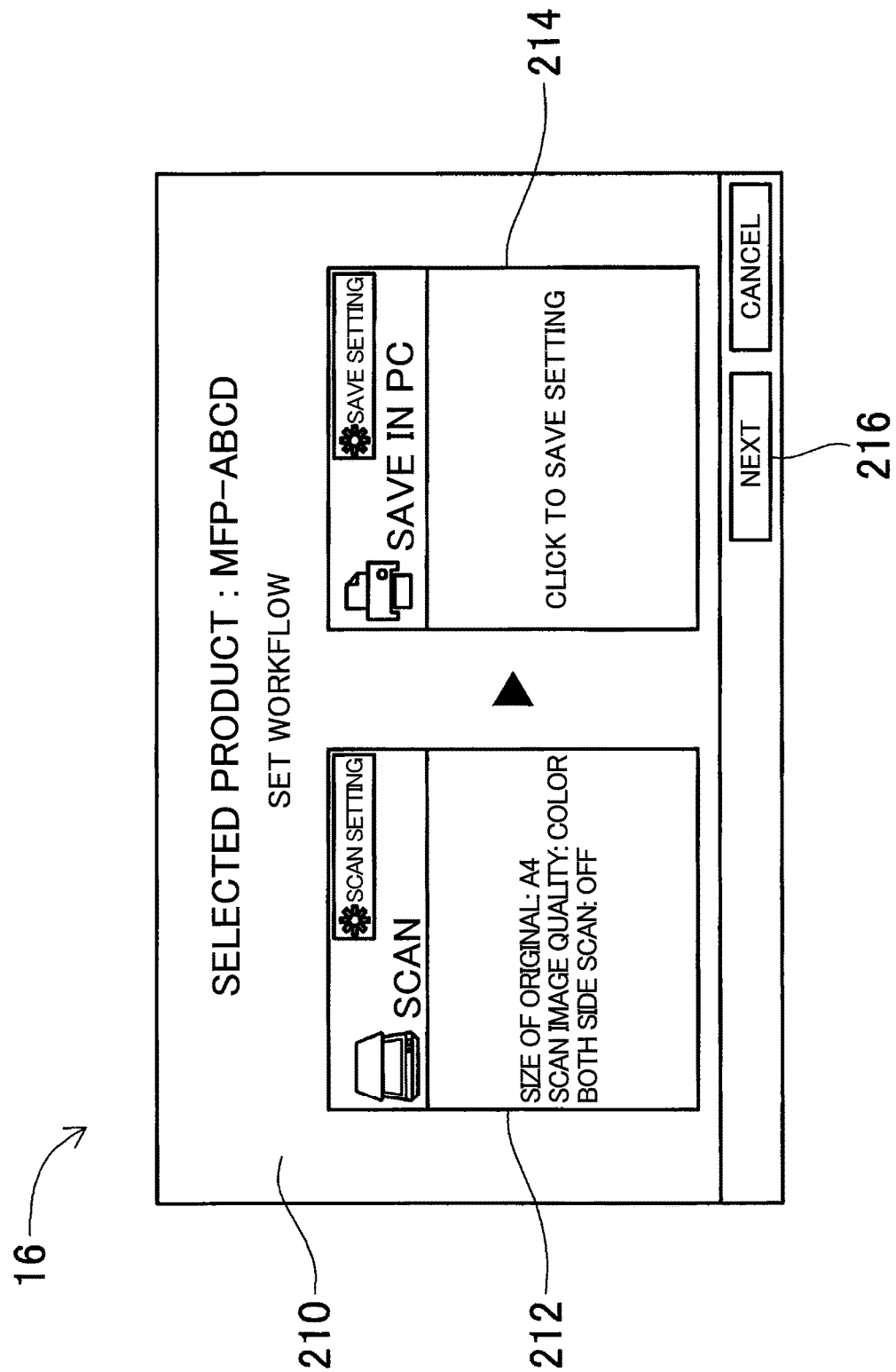
FIG. 12 illustrates a process information setting screen according to the embodiment.

When the scan selection button 134 is operated on the first function selection screen 130 illustrated in FIG. 5, a workflow for scanning process (hereinafter simply referred to as "scanning workflow") as an example of another workflow is created. More specifically, when the scan selection button 134 on the first function selection screen 130 is operated, a second function selection screen 200 corresponding to the scanning process as illustrated in FIG. 11 appears on the display 16. A PC selection button 202, a cloud service selection button 204, an email selection button 206, and an application selection button 208 are shown on the second function selection screen 200. When the PC selection button 202 is operated, a process information setting screen 210 appears on the display 16 as illustrated in FIG. 12.

A scan setting column 212 and a save location setting column 214 are shown on the process information setting screen 210. The scan setting column 212 is adapted to set a scanning condition. By user's operation to the scan setting column 212, scanning condition such as size of an original, request for color scanning, and request for duplex scanning and the like can be set. The save location setting column 214 is adapted to set a location to save the scanning data. By user's operation to the save location setting column 214, the saving location of the scanning data in the storage 26 of the PC 10 is specifically set.

When the cloud service selection button 204 is operated on the second function selection screen 200 shown in FIG. 11, a process information setting screen (not shown) appears. A scanning condition and a location to upload scanning data in the cloud service are set in the setting screen. These settings are the same as the settings of the scanning condition on the process information setting screen 210, and further description is therefore omitted. Further, when the email selection button 206 is operated on the second function selection screen 200, a process information setting screen (not shown) appears. A scanning condition and the e-mail address for delivering the scanning data are set in the setting screen. These settings are the same as the settings of the scanning condition on the process information setting screen 210, and further description is therefore omitted. Further, when the application selection button 208 is operated on the second function selection screen 200, a process information setting screen (not shown) appears. A scanning condition and an application for displaying the image based on the scanning data on the display 16 are set in the setting screen. These settings are the same as the settings of the scanning condition on the process information setting screen 210, and further description is therefore omitted.

The scanning condition and the saving location of the scanning data or the like are set on the process information setting screen 210. When a NEXT button 216 is operated on the process information setting screen 210, the workflow creation screen 180 shown in FIG. 10 appears on the display 16. When the creation button 190 is operated on the workflow creation screen 180, a scanning workflow will be created. More specifically, the scanning condition and the saving location of the scanning data in the storage 26 that have been set on the process information setting screen 210 are specified, when the PC selection button 202 is operated on the second function selection screen 200. Thus, the workflow data for executing the scanning workflow is created such that the scanning process can be executed in accordance with the preset scanning condition and such that the scan data created by the scanning process can be stored in the saving location.

Further, the scanning condition and the upload location of the scanning data in the cloud service that have been set in the process information setting screen are specified, when the cloud service selection button 204 is operated on the second function selection screen 200. Thus, the workflow data for executing the scanning workflow is created, such that the scanning process can be executed in accordance with the preset scanning condition and such that the scan data created by the scanning process can be uploaded in the designated cloud service.

Further, the scanning condition and the e-mail address for transmitting the scanning data that have been set in the process information setting screen are specified, when the email selection button 206 is operated on the second function selection screen 200. Thus, the workflow data for executing the scanning workflow is created, such that the scanning process can be executed in accordance with the preset scanning condition and such that the scan data created by the scanning process can be transmitted to the designated e-mail address.

The scanning condition and the application that have been set in the process information setting screen are specified, when the application selection button 208 is operated on the second function selection screen 200. Thus, the workflow data is created, such that the scanning process can be executed in accordance with the preset scanning condition and such that an image based on the scan data created by the scanning process can be displayed on the display 16 by the designated application.

Further, the device ID of the selected device and the shortcut data are stored as the workflow data in the storage 26 in correlation with each other. In accordance with the procedure, the workflow data is created and stored in the storage 26.

When the device selection button 106 is operated to select the selected device on the first top screen 100 as illustrated in FIG. 2 in the condition where the workflow data that defines the printing workflow or the scanning workflow or the like has been stored in the storage 26 as described above, the second top screen 110 appears on the display 16. In this case, the icons for executing the workflows that have been set for the selected device are shown in the second top screen 110. More specifically, when the device selection button 106 is operated so that the selected device is selected on the first top screen 100, the device ID of the selected device (hereinafter simply referred to as "selected device ID") is specified. As described above, the processes executable in the device corresponding to the device ID are specified, and the second top screen 110 then appears on the display 16 to indicate the print processing icon 102 and the scan processing icon 104 corresponding to the processes executable in the selected device.

Figure 13:
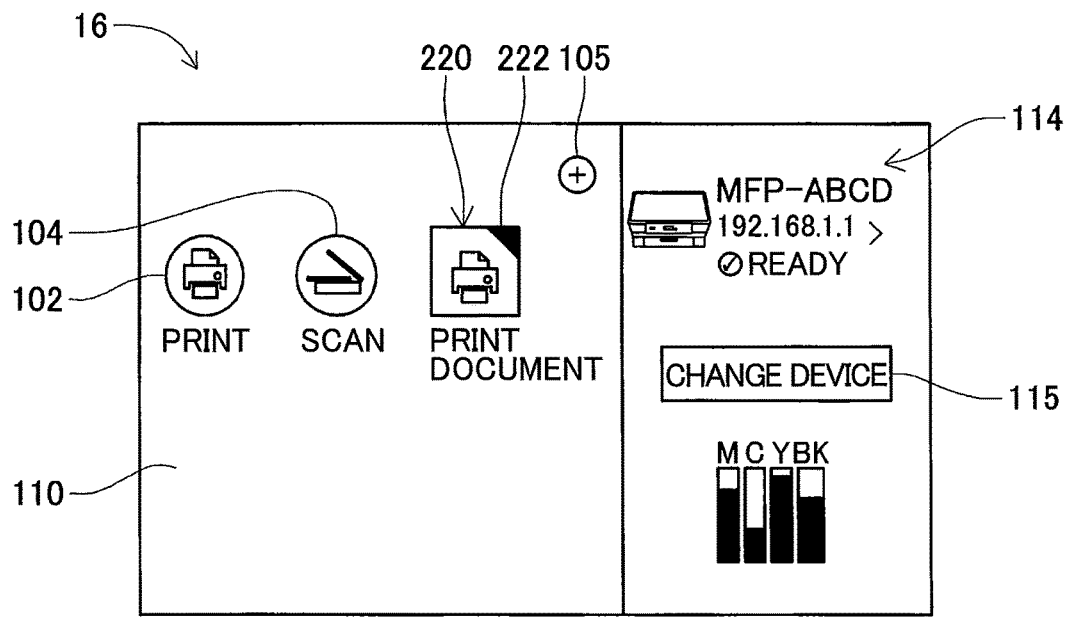
FIG. 13 illustrates the second top screen according to the embodiment.
Figure 14:
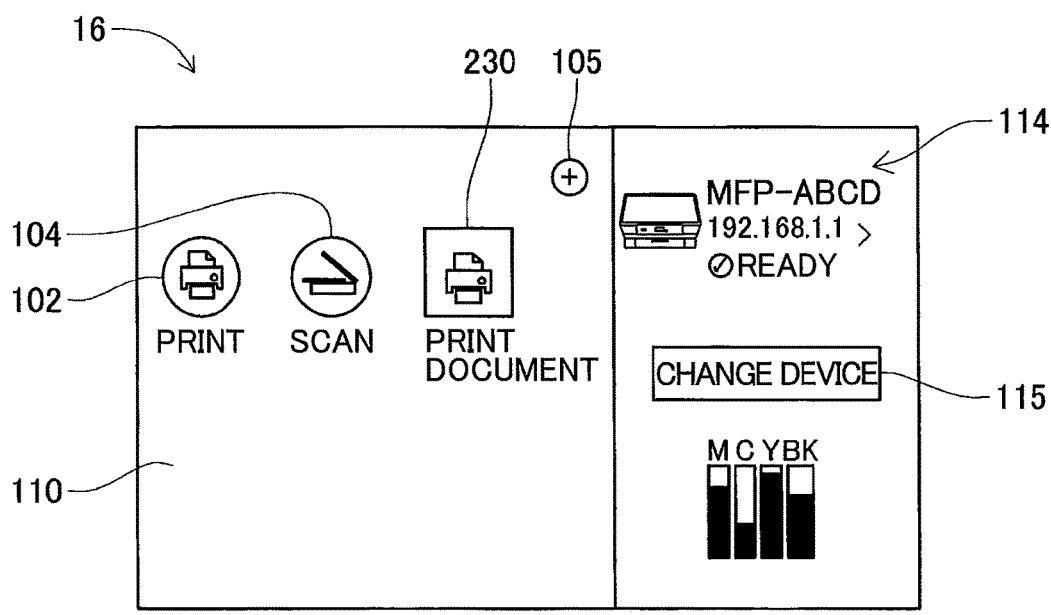
FIG. 14 illustrates the second top screen according to the embodiment.

Further, the device ID contained in the workflow data, that is, the device ID stored in correlation with the workflow (hereinafter simply referred to as "workflow-correlated device ID") is extracted, and the judgement is made as to whether the selected device ID is coincident with the workflow-correlated device ID. When the judgment is made that the selected device ID is coincident with the workflow-correlated device ID, icons 220, 230 (hereinafter simply referred to as "workflow execution icons which are examples of "first instruction image") appear on the second top screen 110 for executing the workflow stored correlated to the workflow-correlated device ID, as illustrated in FIGS. 13 and 14. Drawing patterns of the workflow execution icons 220 and 230 are the same as that of the icon image 182 on the workflow creation screen 180 illustrated in FIGS. 10. The name inputted in the workflow name input column 184 on the workflow creation screen 180 is shown at each position below the workflow execution icons 220 and 230.

The drawing patterns of the workflow execution icons 220, 230 are different from each other, because the shortcut data contained in the workflow data are different from each other. More specifically, the workflow data containing workflow-correlated device ID that has been determined to be coincident with the selected device ID is specified, and the shortcut data contained in the workflow data is extracted. When the shortcut data indicates ON, that is, if the check box 186 has been checked on the workflow creation screen 180 illustrated in FIG. 10, the user requires that the shortcut function be added to the icon for carrying out the workflow. Accordingly, the workflow execution icon 220 provided with the shortcut function appears on the second top screen 110 as illustrated in FIG. 13.

Otherwise, when the shortcut data contained in the workflow data is OFF, that is, if the check box 186 has not been checked on the workflow creation screen 180 illustrated in FIG. 10, the user does not require adding the shortcut function to the icon for carrying out the workflow. Accordingly, the workflow execution icon 230 without having the shortcut function appears on the second top screen 110 as illustrated in FIG. 14. As is apparent from FIGS. 13 and 14, a triangular fill 222 is provided at a right upper portion of the workflow execution icon 220, whereas such a fill is not provided in the workflow execution icon 230. In this way, the drawing patterns of the workflow execution icons 220, 230 are different from each other in accordance with the shortcut data contained in the workflow data.

Figure 15:
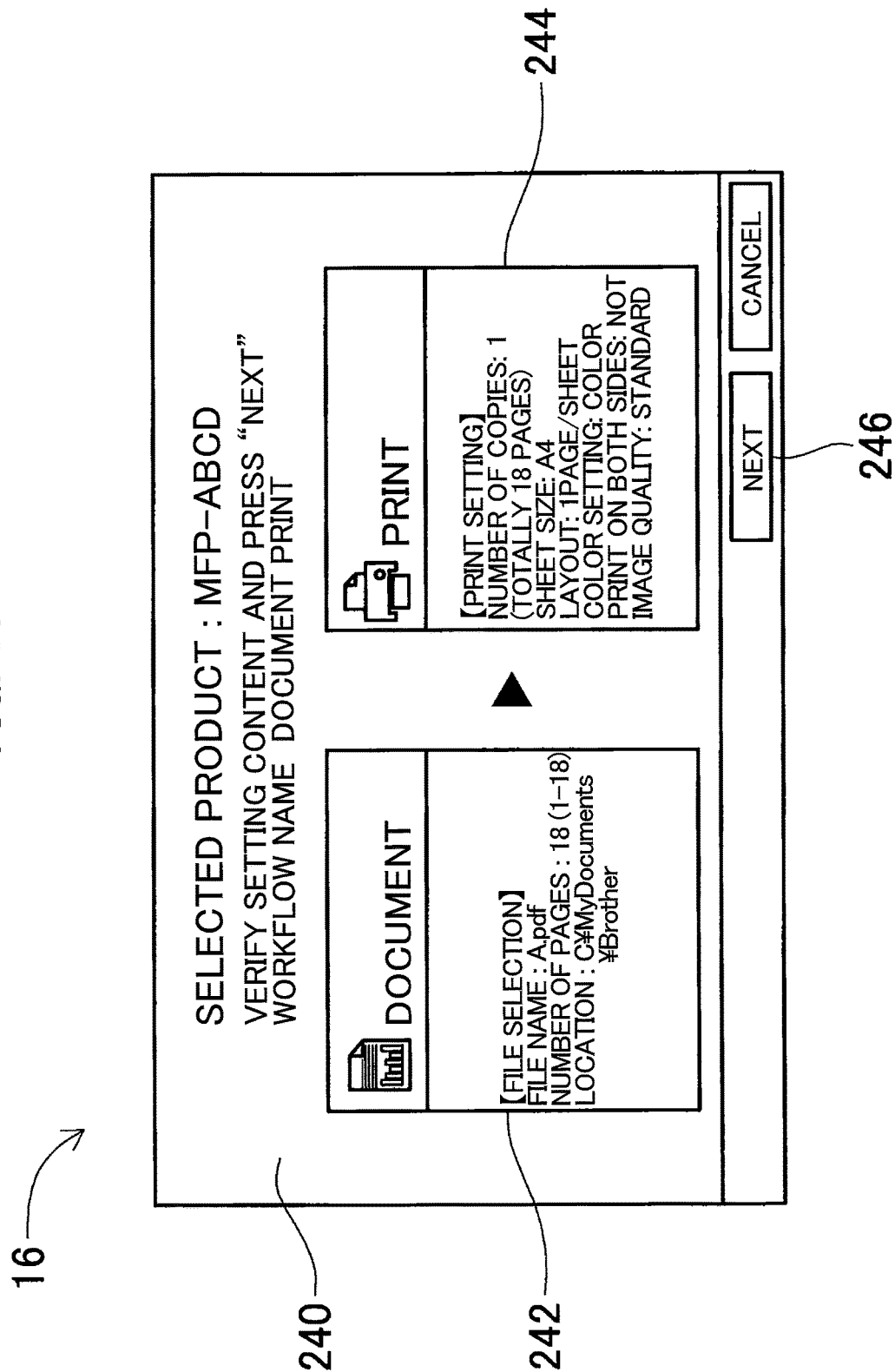
FIG. 15 illustrates a verification screen according to the embodiment.

When the workflow execution icon 230 is operated on the second top screen 110 shown in FIG. 14, a verification screen 240 appears on the display 16 as illustrated in FIG. 15. The verification screen 240 is an example of "verification screen". An image data displaying column 242 and a setting condition displaying column 244 are shown on the verification screen 240. The image data set as the print target in the printing workflow is shown in the image data displaying column 242. Data or information of the printing condition or print settings set in the printing workflow is shown in the setting condition displaying column 244. The user confirms the data shown in the image data displaying column 242 and the setting condition displaying column 244, and operates an execution button 246 on the verification screen 240 after the confirmation. As a result, the printing process is executed in accordance with the printing workflow.

Otherwise, when the workflow execution icon 220 is operated on the second top screen 110 shown in FIG. 13, the printing process in accordance with the printing workflow will be executed without displaying the verification screen 240 on the display 16. Accordingly, when the workflow execution icon 230 not provided with the shortcut function is operated, appropriate printing process can be thus guaranteed because the user's confirmation of the printing workflow on the verification screen 240 is followed by the execution of the printing process based on the printing workflow. Further, the display of the verification screen 240 and the operation on the execution button 246 on the verification screen 240 can be omitted by the operation of the workflow execution icon 220. Therefore, the printing process can be carried out with such a simple operation, when the workflow execution icon 220 with the shortcut function is operated.

Figure 16:
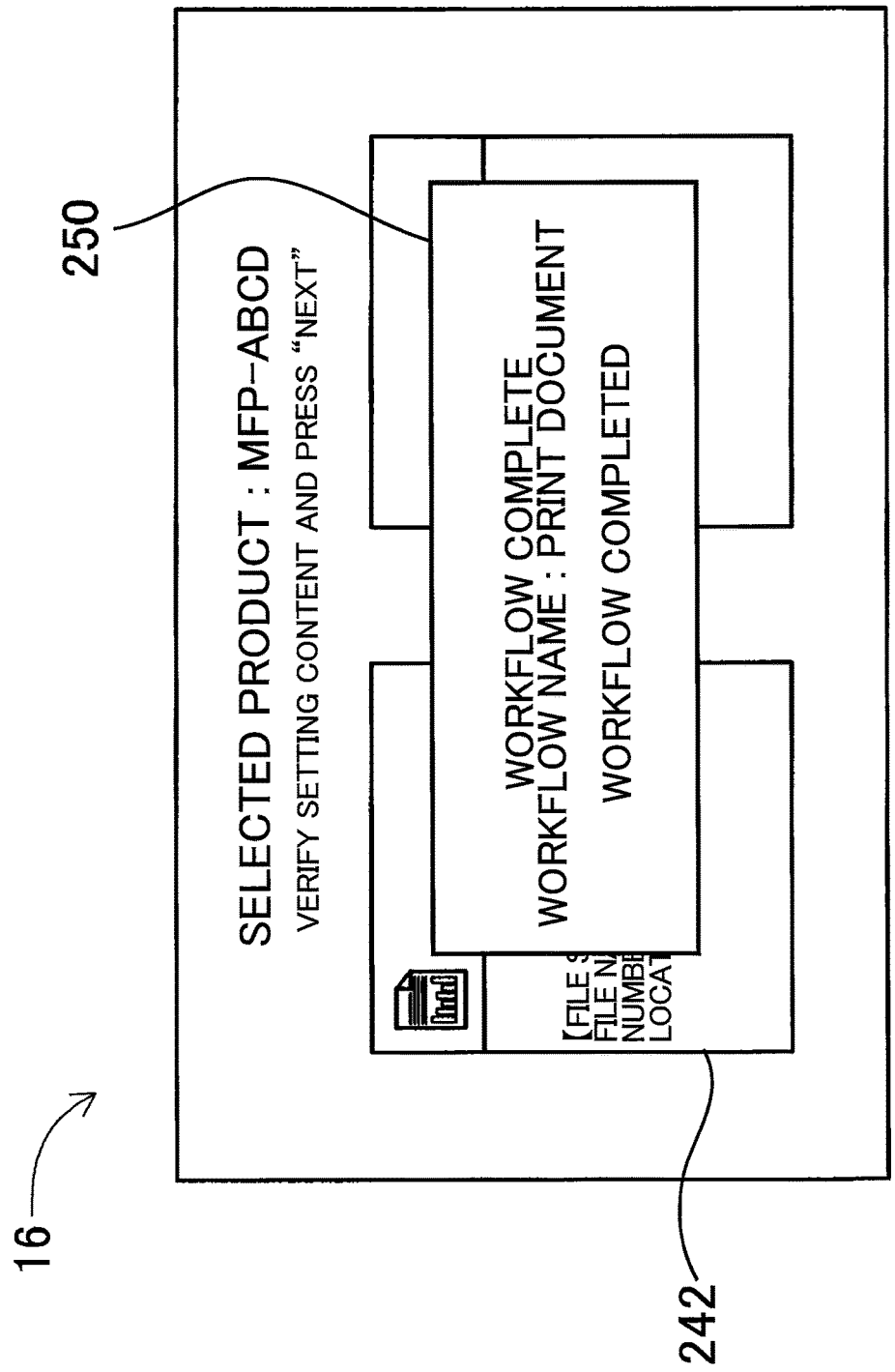
FIG. 16 illustrates a completion screen according to the embodiment.

A progress screen (not shown) appears on the display 16 during execution of the printing process in accordance with the printing workflow. A cancel button (not shown) is shown on the progress screen. Printing process in accordance with the printing workflow can be cancelled by operating the cancel button. Otherwise, if the cancel button is not operated, the printing process based on the printing workflow is completed and a completion screen 250 illustrated in FIG. 16 then appears on the display 16.

In this way, the print settings for executing the printing workflow and the device ID are stored as the workflow data in the storage 26 in correlation with each other in the PC 10. When the device is selected and the device ID of the selected device is coincident with the device ID stored in the storage 26, the workflow execution icon 220 or 230 corresponding to the printing workflow stored in correlation with the device ID is shown. By operating the workflow execution icon 220 or 230, the printing process in accordance with the printing workflow is executed. Accordingly, the printing workflow can readily be created, and the printing process in accordance with the created workflow can be executed with the simple operation.

[Control Program]

The creation of the printing workflow and the execution of the printing process in accordance with the printing workflow are carried out by the execution of the control program 24 in the CPU 12. Control routine in the control program 24 will be described with reference to FIGS. 17 through 21.

Figure 17:
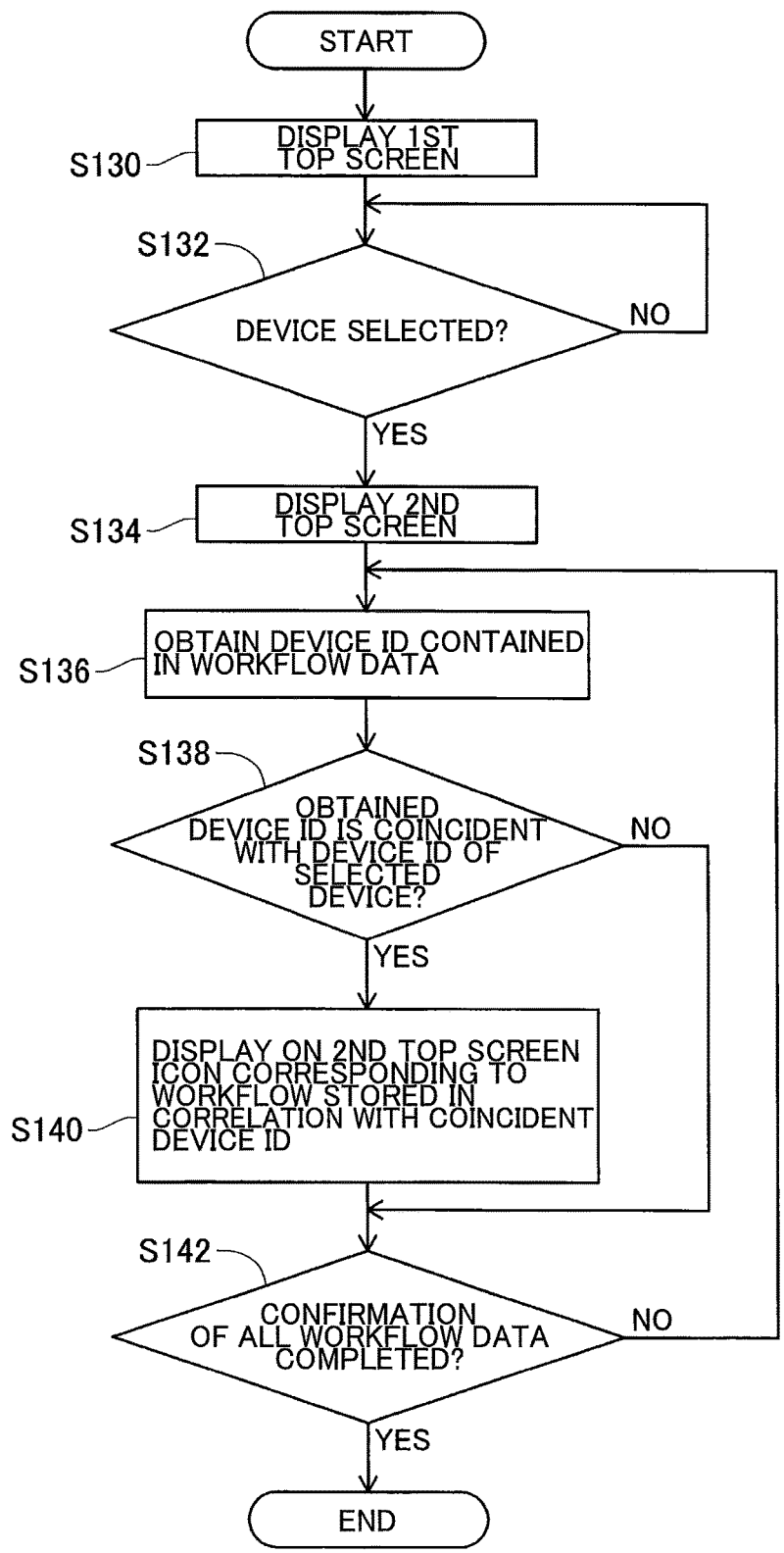
FIG. 17 is a flowchart illustrating steps in device selection according to the embodiment.

Upon receipt of instruction for starting the control program 24 from the user, the CPU 12 executing the control program 24 displays the first top screen 100 on the display 16 (S130) as illustrated in FIG. 17. Next, the CPU 12 determines whether the device has already been selected (S132). That is, the CPU 12 determines whether the device selection button 106 is operated on the first top screen 100 and a device is selected by the user on the selection screen. When the device is not selected (S132: NO), the processing of S132 is repeated. Otherwise, when the device is selected (S132: YES), the second top screen 110 is displayed on the display 16. As described above, the device ID is obtained from the device when the selection screen is displayed. In S134, the device ID of the selected device among the obtained device IDs is stored in the storage 26.

Next, the device ID contained in the workflow data is obtained (S136). Then, the CPU 12 determines whether the obtained device ID, i.e., the workflow-correlated device ID is coincident with the selected device ID (S138). In this case, when the workflow-correlated device ID is coincident with the selected device ID (S138: YES), the workflow data stored in correlation with the device ID is specified, and the workflow execution icon 220 or 230 in accordance with the workflow data is shown on the second top screen 110 (S140).

When the workflow execution icon 220 or 230 is shown on the second top screen 110, the shortcut data contained in the workflow data is reviewed. When the shortcut data is ON, the workflow execution icon 220 is shown on the second top screen 110. Otherwise, when the shortcut data is OFF, the workflow execution icon 230 is shown on the second top screen 110. Then the process goes to S142. On the other hand, when the workflow-correlated device ID is not coincident with the selected device ID (S138: NO), the processing in S140 is not performed and the processing goes to S142.

In S142, the CPU 12 determines whether the processing from S136 to S138 is completed with respect to all the workflow data stored in the storage 26. When the CPU 12 determines that the processing from S136 to S138 with respect to all the workflow data is not completed (S142: NO), the processing returns to S136. Otherwise, when the CPU 12 determines that the processing from S136 to S138 with respect to all the workflow data is completed (S142: YES), the processing is terminated.

Figure 18:
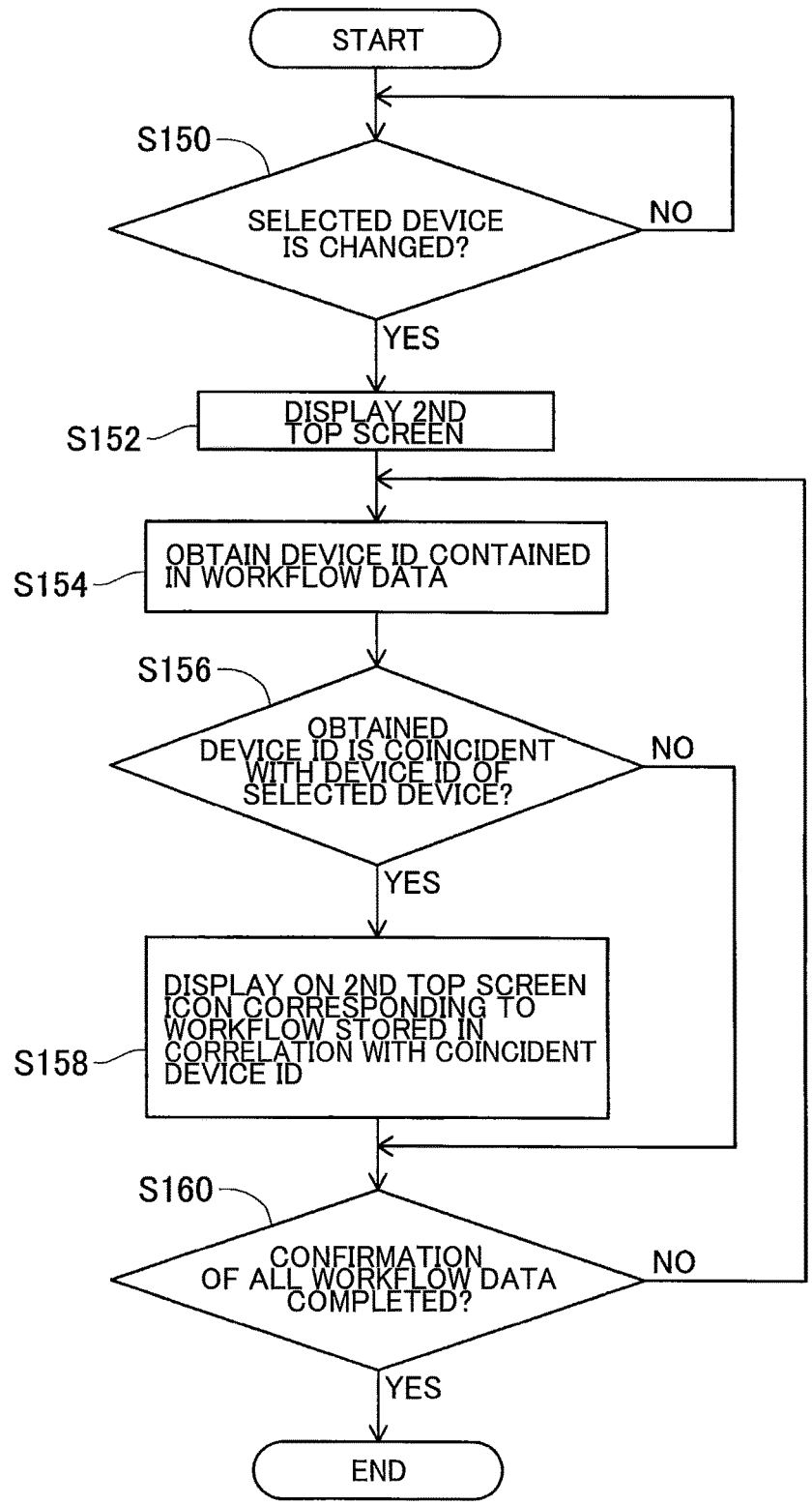
FIG. 18 is a flowchart illustrating steps in device changing processing according to the embodiment.

When the device changing button 115 is operated on the second top screen 110, device changing processing illustrated in FIG. 18 is executed. In the device changing processing where the workflow execution icon 220 or 230 can be displayed on the second top screen 110, the CPU 12 firstly determines whether the selected device is changed (S150). That is, judgement is made as to whether the device changing button 115 is operated on the second top screen 110 and whether a new device is freely selected or set on the selection screen by the user. When the selected device is not changed (S150: NO), the processing of S150 is repeated. Otherwise, when the selected device is changed (S150: YES), the processing from S152 to S160 is executed. The processing from S152 to S160 is the same as the processing from S134 to S142, and further description will be therefore omitted.

Figure 19:
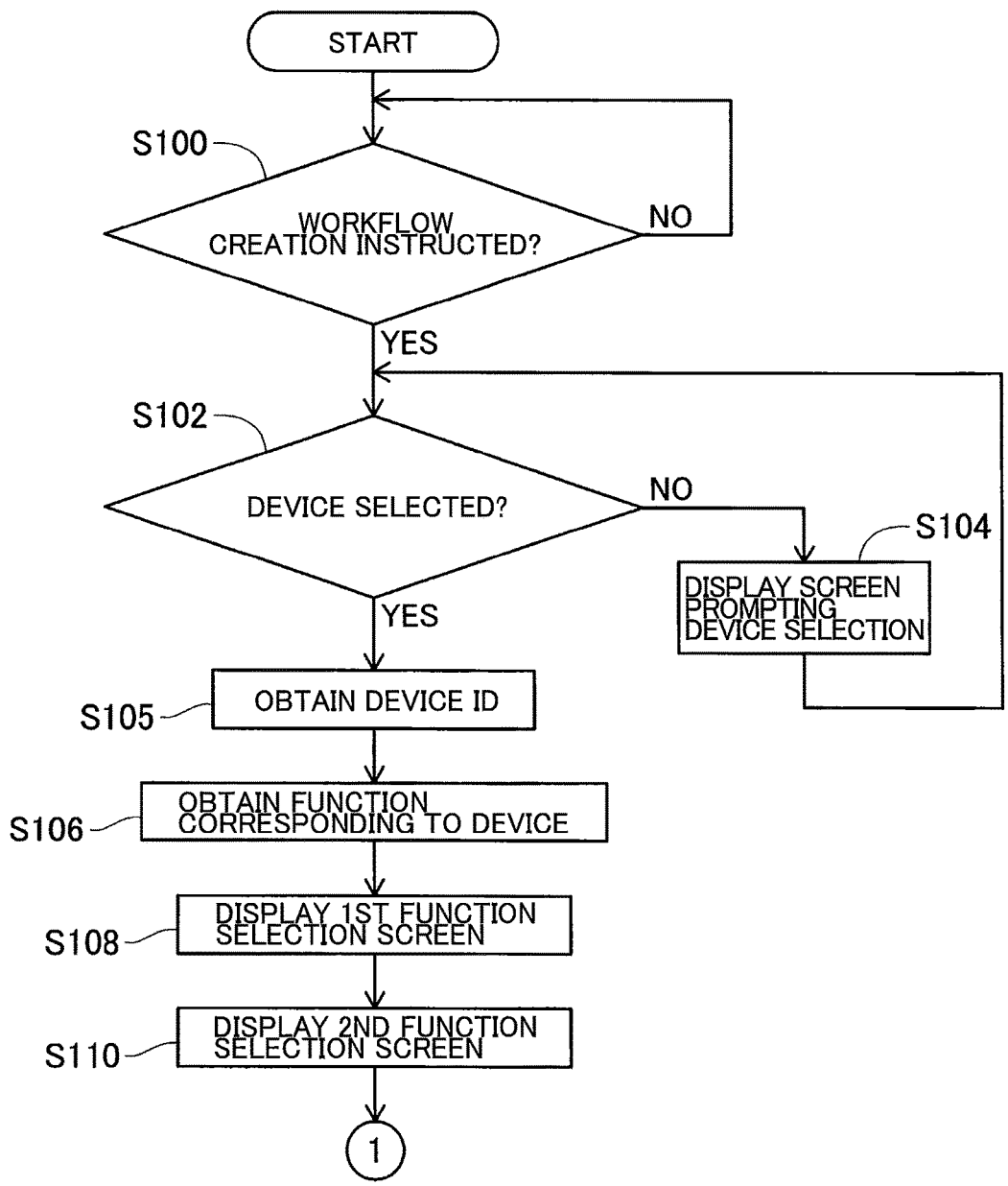
FIG. 19 is a flowchart illustrating steps in creation of a printing workflow according to the embodiment.
Figure 20:
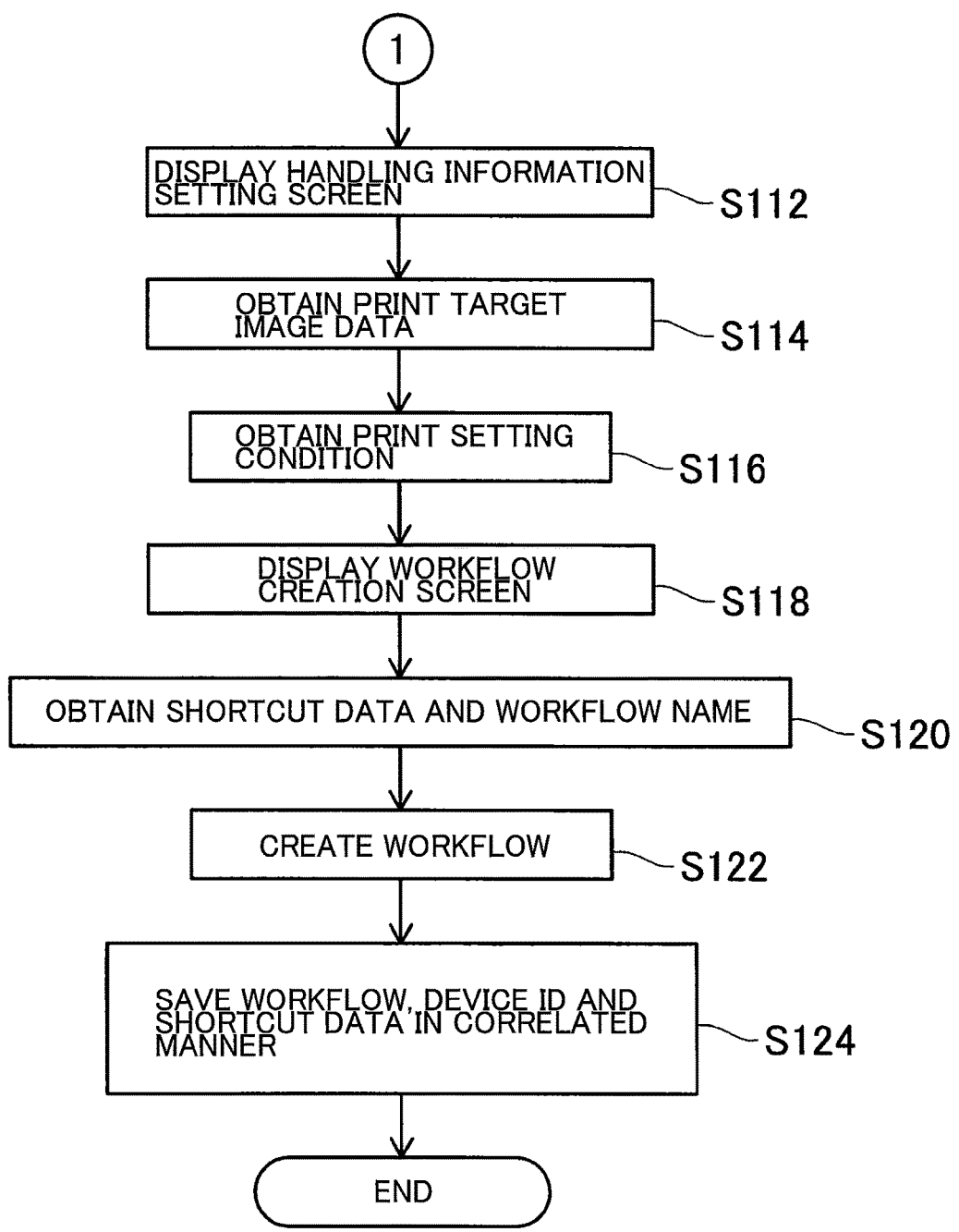
FIG. 20 is a flowchart illustrating steps in the creation of the printing workflow according to the embodiment.

When one of the first top screen 100, the second top screen 110 and word balloon screen 120 is displayed, the processing shown in FIGS. 19 and 20 is repeatedly executed. In the creation of the printing workflow as illustrated in FIG. 19, the CPU 12 firstly determines whether operation for instructing to create a workflow is performed (S100). That is, the CPU determines whether the workflow creation button 105 is operated on one of the first top screen 100 and the second top screen 110, or determines whether the creation button 126 is operated on the word balloon screen 120. When the determination is made that operation for instructing to create a workflow is not performed (S100: NO), the processing of S100 is repeated. Otherwise, when the determination is made that operation for instructing to create a workflow is performed (S100: YES), the CPU 12 determines whether the device has already been selected (S102).

In case where the device has not been selected (S102: NO), a screen (not shown) for prompting selection of a device is shown on the display 16 (S104), and the processing returns to S102. Otherwise, in case where the device has already been selected (S102: YES), the device ID of the selected device is acquired (S105). As described above, in S134, the device ID of the selected device among the acquired device IDs is stored in the storage 26 of the PC 10, and the device ID that has been stored is acquired in S105. Next, functions corresponding to the selected device, i.e., processes executable by the selected device are acquired (S106). Then, the first function selection screen 130 appears on the display 16 (S108). Incidentally, the print selection button 132 and other buttons are shown on the first function selection screen 130 in accordance with the function corresponding to the selected device acquired in S106.

Then, when the print selection button 132 is operated on the first function selection screen 130, the second function selection screens 140 and 200 are displayed on the display 16 (S110). Then, when the document selection button 142 is operated on the second function selection screens 140, 200, the process information setting screens 150, 160, 170, 210 appear on the display 16 as illustrated in FIG. 20 (S112). Then, by operating to the document setting column 152 and etc. on the process information setting screens 150, 160, 170, 210, a path data of the print target image data is obtained (S114). Further, by operating the print setting column 154 and etc. on the process information setting screens 150, 160, 170, 210, print setting condition is obtained (S116).

When the button 176 is operated on the process information setting screens 150, 160, 170 and 210, the workflow creation screen 180 appears on the display 16 (S118). When the check box 186 on the workflow creation screen 180 is operated, the CPU 12 acquires the shortcut data and the name of workflow (S120). Subsequently, the workflow data is created on the basis of the path data and the print settings of the print target image data (S122). Then, the device ID, the shortcut data, and the name of workflow are correlated to the created workflow data and stored as the workflow data (S124). Then, the process is ended.

When the second top screen 110 is displayed, the processing illustrated in FIG. 21 is repeatedly performed. In the printing process in accordance with the printing workflow in FIG. 21, the CPU 12 determines whether operation on the workflow execution icon 220 or 230 is performed (S170). If no operation on the workflow execution icon 220 or 230 is performed (S170: NO), the processing of S170 is repeated. If the operation on the workflow execution icon 220 or 230 is performed (S170: YES), the CPU 12 determines whether the operated icon is the one-touch icon, i.e., whether the operated icon is the workflow execution icon 220 to which the shortcut function has been added (S172). If the operated icon is not the one-touch icon (S172: NO), that is, if the workflow execution icon 230 is operated, the verification screen 240 is displayed on the display 16 (S174).

In S176, the CPU 12 determines whether the execution button 246 is operated on the verification screen 240. When the execution button 246 is not operated (S176: NO), the CPU 12 determines whether the cancel button is operated (S177). When the cancel button is not operated (S177: NO), the processing of S176 is repeated. Otherwise, when the cancel button is operated (S177: YES), the processing is terminated. When the execution button 246 is operated in S176 (S176: YES), the printing process in accordance with the printing workflow is executed (S178). More specifically, the workflow data corresponding to the icon is retrieved, and the printing workflow defined by the workflow data is executed. When the icon operated in S172 is the one-touch icon (S172: YES), that is, when the workflow execution icon 220 is operated, the processing goes to the printing process in accordance with the printing workflow without executing the processing in S174 and S176.

The progress screen is displayed on the display 16 when the printing process in accordance with the printing workflow is executed (S180). Next, the CPU 12 determines whether the cancel button is operated on the progress screen (S182). When the cancel button is operated (S182: YES), the printing process in accordance with the printing workflow is cancelled (S184) and the processing is terminated. Otherwise, when the cancel button is not operated (S182: NO), the CPU 12 determines whether the printing process in accordance with the printing workflow has been completed (S186). When the printing process in accordance with the printing workflow has not been completed (S186: NO), the processing returns to S182. Otherwise, when the printing process in accordance with the printing workflow is completed (S186: YES), a completion screen 250 appears on the display 16 (S188) and the processing is terminated. Incidentally, although not shown in the figures, when the execution icon of the scanning workflow has been operated, processing similar to the processing in FIG. 21 will be executed except that the scanning workflow is executed instead of the printing process in S178.

The CPU 12 executing the processing S105, S114, S116, S120, and S106 are examples of a first acquisition process, a second acquisition process, a third acquisition process, a fourth acquisition process, and a fifth acquisition process, respectively. The CPU 12 executing the processing S140 and S108 are examples of a first displaying process and a second displaying process, respectively. The CPU 12 executing the S124 is an example of a storing process. The CPU 12 executing the S138 is an example of a determining process.

While the invention has been described in detail and with reference to specific embodiment thereof, it would be apparent to those skilled in the art that various changes and modifications may be made therein without departing from the scope of the invention. More specifically, in the above-described embodiment, the device ID and the printing workflow are stored in one-to-one relationship. However, relationship in storage can be the one device ID to a plurality of printing workflows. For example, assuming that printing workflow A and printing workflow B are created with respect to the single device A, in the above-described embodiment, the device ID of the device A and the printing workflow A are stored in correlated manner, and the device ID of the device A and the printing workflow B are stored in correlated manner. However, according to the modification, the device ID of the device A and the printing workflows A and B are stored in correlated manner.

Further, in the above-described embodiment, the word balloon screen 120 appears on the display 16, when the workflow creation button 105 is operated on the second top screen 110, that is, when clicking the left mouse button in a state where the cursor is moved onto the workflow creation button 105 by the mouse. However, the word balloon screen 120 can appear on the display 16 as a result of movement of the cursor onto the workflow creation button 105 by the mouse.

Further, in the above-described embodiment, the processes shown in FIGS. 17 through 21 are executed by the CPU 12. However, these processes can be executed by ASIC (Application Specific Integrated Circuit) and other logic integrated circuit instead of the CPU 12, or can be executed by cooperation of the CPU, ASIC and other logic integrated circuit.

When all or parts of the functions in the present disclosure are implemented by computer programs performed by the computer 10, the programs can be stored on a non-transitory computer-readable storage medium. The programs may be used from the same storage medium on which they are provided (an example of a computer-readable storage medium), or may be first loaded onto a different storage medium (an example of a computer-readable storage medium). The "non-transitory computer-readable storage medium" may be a portable medium, such as a memory card, CD-ROM, or DVD-ROM; storages mounted in a server to which the computer 10 can access, or an external storage device. The programs stored in the storage of the server may be provided as information or signals indicating the programs via the network such as the Internet.

What is claimed is:

1. A non-transitory computer readable storage medium storing a set of program instructions for an information processing apparatus comprising a processor, storage, a display, and an interface connectable to at least one device, the set of program instructions, when executed by the processor, causes the information processing apparatus to perform:
   receiving a selection of a first device from among the at least one device;
   acquiring a first device identification information to identify the first device;
   acquiring image data identification information to identify image data;
   acquiring first setting information including a first image process setting for processing an image based on the image data;
   storing in the storage the first device identification information and a first workflow for processing the image in accordance with the first image process setting, the first device identification information and the first workflow being stored in correlation with each other;
   receiving a selection of a second device from among the at least one device, the second device being different from the first device;
   acquiring a second device identification information to identify the second device;
   acquiring a second setting information including a second image process setting for processing an image based on the image data;
   storing in the storage the second device identification information and a second workflow for processing the image in accordance with the second image process setting, the second device identification information and the second workflow being stored in correlation with each other;
   receiving selection of a third device;
   acquiring a third device identification information of the third device;
   determining whether the third device identification information is coincident with one of the first device identification information and the second device identification information;
   displaying a device image indicating the third device and a first instruction image in correlation with each other in the display;
   wherein, when it is determined that the third device identification information is coincident with the first device identification information, the device image indicates the first device identified by the first device identification information and the first instruction image is configured to be operated to output toward the first device an instruction to execute a process in accordance with the first workflow stored in correlation with the device identification information; and
   wherein, when it is determined that the third device identification information is coincident with the second device identification information, the device image indicates the second device identified by the second device identification information and the first instruction image is configured to be operated to output toward the second device an instruction to execute a process in accordance with the second workflow stored in correlation with the second device identification information.

2. The non-transitory computer readable storage medium according to claim 1, wherein the displaying displays in the display the device image, the first instruction image, and a second instruction image in correlation with each other, the second instruction image being configured to allow setting a process in a setting process and configured to be operated to output, toward the third device indicated in the device image, an instruction to execute the print process set in the setting process.

3. The non-transitory computer readable storage medium according to claim 2, wherein the set of program instructions, when executed by the processor, causes the information processing apparatus to further perform:
   counting a total number of the process in accordance with the instruction outputted by the operation on the second instruction image; and
   wherein the displaying further displays in the display the device image, the second instruction image, and an explanation about the workflow in correlation with each other when the total number is greater than or equal to a predetermined number.

4. The non-transitory computer readable storage medium according to claim 1, wherein, in response to changing the third device to a changed device as the device for executing the process from among the at least one device, the displaying displays in the display the first instruction image stored in correlation with device identification information identifying the changed device.

5. The non-transitory computer readable storage medium according to claim 1, wherein each of the first workflow and the second workflow includes:
   a third workflow to display, before executing the process, a verification screen in the display to confirm whether to execute the process, and
   a fourth workflow to inhibit the verification screen from being displayed before executing the process;
   wherein the set of program instructions, when executed by the processor, causes the information processing apparatus to further perform acquiring processing execution information indicating whether the process should be executed in accordance with the third workflow or the fourth workflow;
   wherein in the storing, the first workflow, the first device identification information, and the processing execution information are stored in correlation with each other; and
   wherein in the storing, the second workflow, the second device identification information, and the processing execution information are stored in correlation with each other.

6. The non-transitory computer readable storage medium according to claim 5, wherein in the displaying, the first instruction image configured to be operated to output the instruction in accordance with the third workflow is displayed in a configuration different from that of the first instruction image configured to be operated to output the instruction in accordance with the fourth workflow.

7. The non-transitory computer readable storage medium according to claim 1, wherein the storing further stores in the storage, in correlation with each other, a fifth workflow and one of the first device identification information and the second device identification information when the device identified by the one of the first device identification information and the second device identification information can execute the process and another process, the fifth workflow being for executing the another process in accordance with a preset condition different from the process.

8. The non-transitory computer readable storage medium according to claim 7, wherein the set of program instructions, when executed by the processor, causes the information processing apparatus to further perform:
acquiring a process information about a process executable in the device identified by the one of the first device identification information and the second device identification information;
displaying in the display, based on the process information, a selection screen configured to allow selection of one of the first workflow and the fifth workflow as a storing workflow to be stored in the storing when the first device can execute the process and the another process; and
displaying in the display, based on the process information, the selection screen configured to allow selection of one of the second workflow and the fifth workflow as the storing workflow to be stored in the storing when the second device can execute the process and the another process.

9. An information processing apparatus comprising:
storage;
a display;
an interface connectable to at least one device; and
a controller configured to perform
receiving a selection of a first device from among the at least one device,
acquiring a first device identification information to identify the first device selected from among the at least one device;
acquiring image data identification information to identify image data;
acquiring first setting information including a first image process setting for printing an image based on the image data,
storing in the storage the first device identification information and a first workflow for processing the image in accordance with the first image processing setting, the first device identification information and the first workflow being stored in correlation with each other,
receiving a selection of a second device from among the at least one device, the second device being different from the first device,
acquiring a second device identification information to identify the second device,
acquiring a second setting information including a second image process setting for processing an image based on the image data,
storing in the storage the second device identification information and a second workflow for processing the image in accordance with the second image process setting, the second device identification information and the second workflow being stored in correlation with each other,
receiving selection of a third device,
acquiring a third device identification information of the third device,
determining whether the third device identification information is coincident with one of the first device identification information and the second device identification information, and
displaying a device image indicating the third device and a first instruction image in correlation with each other in the display;
wherein, when it is determined that the third device identification information is coincident with the first device identification information, the device image indicates the first device identified by the first device identification information and the first instruction image is configured to be operated to output toward the first device an instruction to execute a process in accordance with the first workflow stored in correlation with the first device identification information; and
wherein, when it is determined that the third device identification information is coincident with the second device identification information, the device image indicates the second device identified by the second device identification information and the first instruction image is configured to be operated to output toward the second device an instruction to execute a process in accordance with the second workflow stored in correlation with the second device identification information.

10. The information processing apparatus according to claim 9, wherein the displaying displays in the display the device image, the first instruction image, and a second instruction image in correlation with each other, the second instruction image being configured to allow setting a process in a setting process and configured to be operated to output, toward the third device indicated in the device image, an instruction to execute the process set in the setting process.

11. The information processing apparatus according to claim 10, wherein the controller is configured to further perform:
counting a total number of the process in accordance with the instruction outputted by the operation on the second instruction image; and
wherein the displaying further displays in the display the device image, the second instruction image, and an explanation about the workflow in correlation with each other when the total number is greater than or equal to a predetermined number.

12. The information processing apparatus according to claim 9, wherein, in response to changing the third device to a changed device as the device for executing the process from among the at least one device, the displaying displays in the display the first instruction image stored in correlation with device identification information identifying the changed device.

13. The information processing apparatus according to claim 9, wherein each of the first workflow and the second workflow includes:
a third workflow to display, before executing the process;
a verification screen in the display to confirm whether to execute the process; and
a fourth workflow to inhibit the verification screen from being displayed before executing the process;
wherein the controller is configured to further perform acquiring processing execution information indicating whether the process should be executed in accordance with the third workflow or the fourth workflow; and
wherein in the storing, the first workflow, the first device identification information, and the processing execution information are stored in correlation with each other; and wherein in the storing, the second workflow, the second device identification information, and the processing execution information are stored in correlation with each other.

14. The information processing apparatus according to claim 13, wherein in the displaying, the first instruction image configured to be operated to output the instruction in accordance with the third workflow is displayed in a configuration different from that of the first instruction image configured to be operated to output the instruction in accordance with the fourth workflow.

15. The information processing apparatus according to claim 9, wherein the storing further stores in the storage, in correlation with each other, a fifth workflow and one of the first device identification information and the second device identification information when a device identified by the one of the first device identification information and the second device identification information can execute the process and another process, the fifth workflow being for executing another process in accordance with a preset condition different from the process.

16. The information processing apparatus according to claim 15, wherein the controller is configured to further perform:
acquiring a process information about a process executable in the device identified by the one of the first device identification information and the second device identification information;
displaying in the display, based on the process information, a selection screen configured to allow selection of one of the first workflow and the fifth workflow as a storing workflow to be stored in the storing when the first device can execute the process and the another process; and
displaying in the display, based on the process information, the selection screen configured to allow selection of one of the second workflow and the fifth workflow as the storing workflow to be stored in the storing when the second device can execute the process and the another process.

\* \* \* \* \*